United States Patent [19]
Sakamoto

[11] 4,438,463
[45] Mar. 20, 1984

[54] TRACKING CONTROL SYSTEM

[75] Inventor: Hitoshi Sakamoto, Zama, Japan

[73] Assignee: Sony Corporation, Tokyo, Japan

[21] Appl. No.: 290,199

[22] Filed: Aug. 5, 1981

[30] Foreign Application Priority Data

Aug. 6, 1980 [JP] Japan ................................. 55-107938

[51] Int. Cl.³ ............................................. G11B 21/10
[52] U.S. Cl. ..................................... 360/10.2; 360/77; 360/70
[58] Field of Search .................. 360/10, 2, 78, 77, 75, 360/70, 10.3; 371/67

[56] References Cited

U.S. PATENT DOCUMENTS

| | | | |
|---|---|---|---|
| 4,287,538 | 9/1981 | Sakamoto et al. | 360/10.2 |
| 4,296,443 | 10/1981 | Sakamoto | 360/77 |

FOREIGN PATENT DOCUMENTS 1579854  11/1980  United Kingdom .................. 360/77

*Primary Examiner*—Alan Faber
*Attorney, Agent, or Firm*—Lewis H. Eslinger; Alvin Sinderbrand

[57] ABSTRACT

An apparatus for reproducing video signals recorded in successive parallel tracks extending obliquely on a record tape, which apparatus includes a rotary head repeatedly scanning across the tape generally in a direction along the tracks for reproducing the signals recorded therein while the tape is advanced longitudinally at a selected reproducing speed which is any arbitrary ratio n of a normal reproducing speed for achieving various reproducing modes, and a transducer deflecting device responsive to a drive voltage for deflecting the head in a direction transverse to said direction along the tracks; a tracking control system is provided with a circuit for determining the value of said ratio n and for extracting, from said value of the ratio n, values m and l of an integer and a fraction, respectively, which aggregate said ratio n; a circuit for forming relatively large and small head jump voltages which respectively correspond to said value m and a value (m−1); a discriminating circuit for determining whether a reproduced phase of the output of said head in correspondence to a specific position along a track is in leading or lagging relation to a reference phase determined on the basis of said value l; and a selector responsive to the output of said discriminating circuit for selecting one of said large and small head jump voltages to be included, at the end of each said scanning, in said drive voltage applied to said transducer deflecting device for determining the next one of said tracks to be scanned.

15 Claims, 19 Drawing Figures

$a = -\frac{1}{2}\alpha$, $b=0$ OR $+\alpha$, $\Delta = a+b$ $a = -\frac{4}{5}\alpha$, $b=0$ OR $+\alpha$, $\Delta = a+b$ $a = -\frac{1}{5}\alpha$, $b=0$ OR $+\alpha$, $\Delta = a+b$

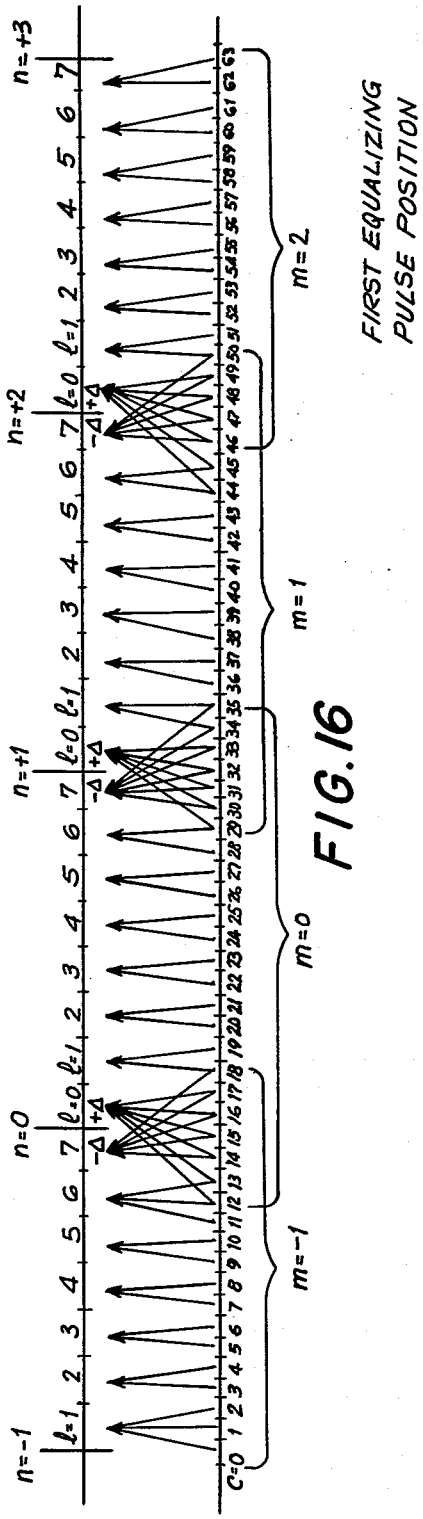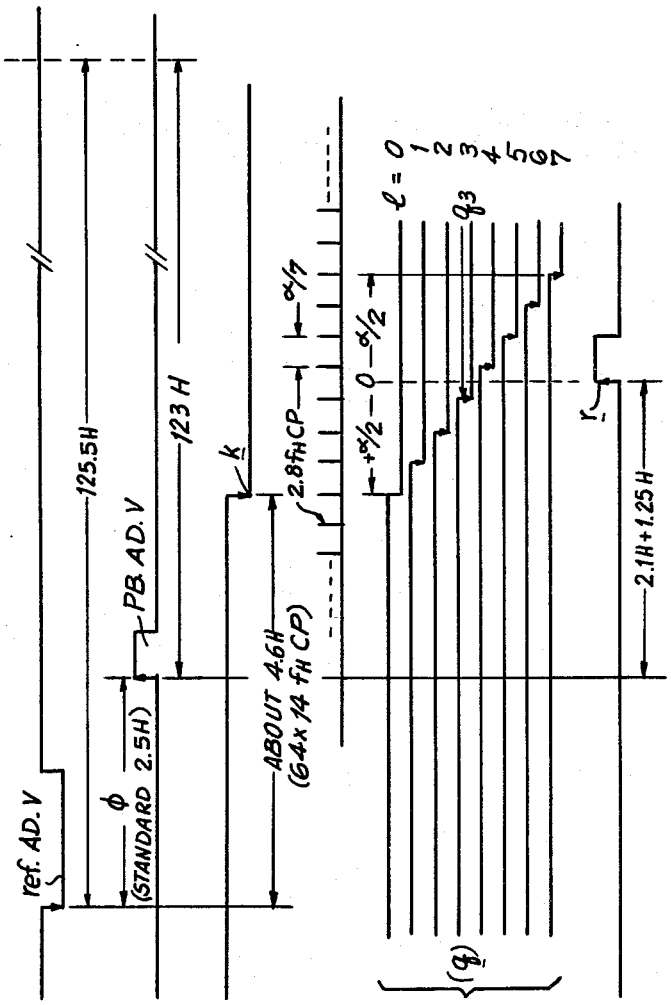
FIG.16
FIG.17A
FIG.17B
FIG.17C
FIG.17D
FIG.17E
FIG.17F

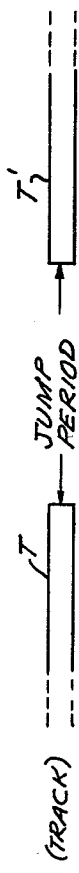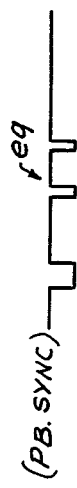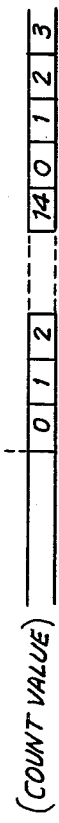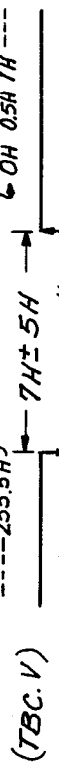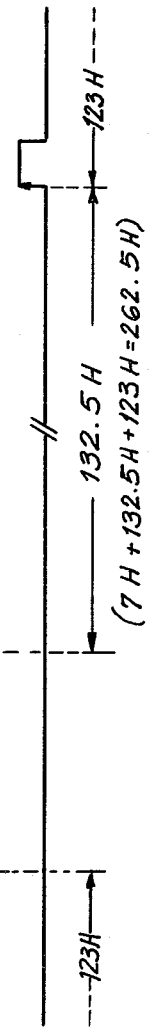
FIG.19A (TRACK)
FIG.19B (PB.SYNC)
FIG.19C (u)
FIG.19D (2fHCP)
FIG.19E (COUNT VALUE)
FIG.19F (TBC.V)
FIG.19G (z)
FIG.19H (Pm)
FIG.19I (PB.Vx)
FIG.19J (PB.AD.V)

TRACKING CONTROL SYSTEM

BACKGROUND OF THE INVENTION

1. Field of the Invention

This invention relates generally to apparatus, such as a video tape recorder (VTR) of the so-called "helical-scan type", in which video or other information signals are recorded in successive parallel tracks which are skewed or extend obliquely on a magnetic tape and, more particularly, is directed to an improved tracking control system by which a magnetic head or other transducer in such apparatus is made to accurately scan the track or tracks for reproducing the video or other information signals recorded therein.

2. Description of the Prior Art

In a helical-scan VTR, the magnetic tape extends helically about at least a portion of the periphery of a guide drum and is adapted to be moved or advanced in the longitudinal direction of the tape while at least a portion of the guide drum is rotated, and the transducer or magnetic head is mounted on a rotated portion of the guide drum so as to rotate with the latter and thereby repeatedly scan across the tape in a path at an angle to the longitudinal direction of the tape. During the recording operation of the VTR, the angle between the scanning path, and hence each record track, and the longitudinal direction of the tape is dependent on the rotational speed of the rotary head and also the speed at which the magnetic tape is longitudinally advanced. If the speed and direction of advancement of the tape are the same during a reproducing operation, as during a recording operation, then the scanning path of the head will be parallel to each record track and a servo system may control either the speed of tape advancement or the rotary speed of the head for obtaining proper scanning of the head along each track. However, if the speed and direction of advancement of the magnetic tape are not the same during the reproducing operation as during the recording operation, then the scanning path of the magnetic head during reproducing will not coincide with a record track on the tape during each movement of the head across the tape and, accordingly, the recorded video or other information signals may not be correctly or accurately reproduced.

Various tracking control or servo systems have been proposed for maintaining correct tracking or scanning of the record tracks by the rotary head. In the most desirable of these known arrangements, for example, as disclosed in U.S. Pat. Nos. 4,163,994, 4,172,265 and 4,237,399, each having a common assignee herewith, the head is mounted on the rotary drum portion by way of an electro-mechanical deflecting means, such as, a bi-morph leaf, for deflecting the head in a direction normal to the plane of its rotation, that is, in a direction which is transverse in respect to the direction along each of the record tracks, and, in the reproducing mode of the VTR, any deviation or tracking error of the head scanning path relative to a recorded track is detected and an electrical drive signal for the bi-morph leaf is correspondingly controlled to correct the tracking error with a view to obtaining a reproduced picture of high quality.

In the non-normal or speed-varied reproducing modes, that is, when the speed and/or direction of advancement of the magnetic tape are not the same during reproducing as during recording, either a track is scanned a plurality of times in a so-called overlapped trace for a slow-motion or still motion reproducing mode, or the tracks are only scanned at intervals in a so-called skip or interval tracing for a quick or fast motion reproducing mode. In the course of each of the foregoing non-normal reproducing modes, it is necessary that, at certain times, the head be made to jump or fly-back with a pitch corresponding to an integer or whole multiple of the track pitch from the terminal end of a track which has been scanned to the initial end of the track which is to be next scanned.

In published Japanese Patent Application No. 117,106/1977 (Applicant: Ampex Corporation), corresponding to U.S. application Ser. No. 677,815, and U.K. patent application No. 1,579,854, it is disclosed to control the head jump by detecting the drive voltage to the bi-morph leaf as an indication of the deflection of the head required for accurately scanning a record track thereby, and, when the detected voltage reaches a predetermined value at which the head deflection approaches the physical limit of that possible with the bi-morph leaf or other transducer deflecting device supporting the head, the drive voltage for the bi-morph leaf is suitably controlled to cause the head to jump or skip as required. However, in the foregoing arrangement, when the head follows a recorded track which is curved or has an offset initial end, the head jump control is adversely affected, and optimum control of the head jump is not achieved. Further, the tracing form or pattern of head jumps that are effected will be varied undesirably when the bi-morph leaf or other transducer deflecting device becomes saturated or when its sensitivity, that is, ratio of its deflection to a unit change in the drive voltage, varies with time.

It has also been proposed, for example, in published Japanese Patent Application No. 113,308/79, corresponding to U.S. Pat. No. 4,296,443, to control the head jump or fly-back and track jump or change on the basis of detected variations of the phase of reproduced vertical synchronizing signals relative to reference synchronizing signals. Although this arrangement avoids influence on the tracing form of curvatures or offsets in the recorded tracks, control of the tracing form is disrupted or altered in the event of any dropouts in the reproduced video signals, and hence in the reproduced vertical synchronizing signals.

Further, the above described existing arrangements for controlling the tracing form are prone to establish undesirable tracing modes, such as, the frame still mode, in which two adjacent tracks having recorded therein the two fields of a frame are scanned alternately when providing a reproduced still-motion picture, or an unbalanced or non-uniform slow reproducing speed. Such undesirable tracking modes are particularly likely to appear when the reproducing tape speed is nearly, but not quite an integer or whole multiple of the recording or normal tape speed.

OBJECTS AND SUMMARY OF THE INVENTION

Accordingly, it is an object of this invention to provide an apparatus for reproducing information signals recorded in successive parallel tracks on a record medium with an improved tracking control system which avoids the above-described problems associated with the prior art.

More particularly, it is an object of this invention to provide a tracking control system, as aforesaid by which information signals recorded in successive parallel tracks on a tape or other record medium can be correctly reproduced in various non-normal reproducing modes, regardless of the reproducing speed ratio, that is, the ratio of the reproducing tape speed to the normal or recording tape speed.

Another object is to provide a tracking control system, as aforesaid, of relatively simple construction which is capable of obtaining optimum tracing control and achieving a stable reproduced picture with minimum picture speed fluctuations at any arbitrarily selected reproducing tape speed.

Still another object is to provide a tracking control system, as aforesaid, which avoids undesirable tracing forms or patterns having abnormal picture speed dispersion, such as are characteristic of the frame still mode or an unbalanced slow-motion mode even when the selected reproducing speed ratio is nearly, but not quite an integer.

In accordance with an aspect of this invention, in any arbitrary n-fold speed reproducing mode (n being the ratio of the selected reproducing tape speed to the normal reproducing or recording speed) of an apparatus for reproducing video signals recorded in successive parallel tracks formed obliquely on the record tape, which apparatus includes transducer means movable in a direction along the tracks for reproducing the signals recorded therein, and transducer deflecting means for deflecting the transducer means in a direction transverse to the direction along the tracks; a fraction value l and an integer value m, which together comprise the value of said ratio n, are extracted from the latter, a reproduced phase of the output of said transducer means at a specific position on a track being scanned is determined, whether such reproduced phase is advanced or in lagging relation in respect to a reference phase determined on the basis of the extracted value l is detected, and, on the basis of such detection of the reproduced phase being in advance, or in lagging relation to the reference phase, one or the other of two head jump voltages respectively corresponding to the values m and (m−1) is applied to the transducer deflecting means.

The above, and other, objects, features and advantages of the invention, will be apparent in the following detailed description of an illustrative embodiment thereof which is to be read in connection with the accompanying drawings.

BRIEF DESCRIPTION OF THE DRAWINGS

FIG. 16 graphically shows a fraction part l and an integer part m of a reproducing speed ratio n extracted from data c;

FIGS. 17A-17F are time charts to which reference will be made in explaining the operation of the trace control circuit of FIG. 15;

FIGS. 19A-19J are timing charts to which reference will be made in explaining the operation of the synchronous processing circuit of FIG. 18.

DETAILED DESCRIPTION OF A PREFERRED EMBODIMENT

Figure 1:
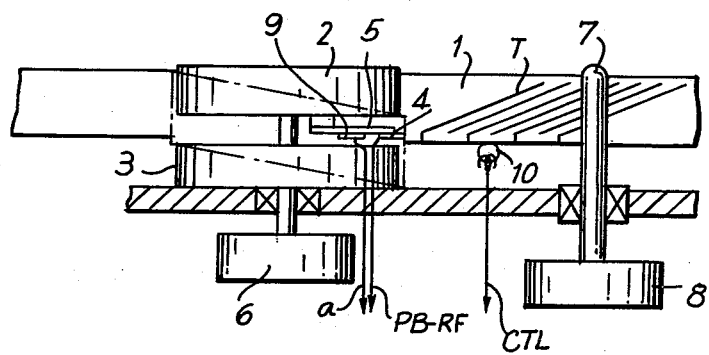
FIG. 1 is a schematic side elevational view of a helical scan type VTR to which the invention may be advantageously applied.

Referring initially to FIG. 1, it will be seen that, in a helical scan type VTR that may be advantageously provided with a tracking servo system according to this invention, a magnetic tape 1 is wound obliquely, over an angular range of approximately 360 degrees, about the outer periphery of an upper drum 2 and a lower drum 3. The upper drum 2 is rotary and is provided with a video head 4 which is supported by a cantilevered bi-morph leaf 5, for example, formed of two piezoceramic plates joined to each other. A motor 6 drives upper drum 2, and hence head 4, at a predetermined rotational speed. The tape 1 is driven longitudinally at any selected speed by a capstan 7 connected to the shaft of a capstan motor 8.

On the surface of bi-morph leaf 5 there is mounted a strain gauge 9, for example, a resistive wire strain gauge, for detecting the amount of deflection of bi-morph leaf 5, and from strain gauge 9 there is obtained a signal SG representative of the resulting deviation of head 4 in the direction transverse to its plane of rotation. Magnetic head 4 provides a reproduced output in the form of a reproduced RF signal, PB-RF, and a reproduced control signal CTL is obtained from a control head 10 disposed at a side edge of tape 1. During recording operation, tape 1 is advanced longitudinally at a predetermined speed, so that video or other information signals are recorded by head 4 in a series of parallel magnetic tracks T at a predetermined slant angle or inclination to the longitudinal direction of the tape. In the normal reproducing mode wherein the reproducing tape speed is the same as the recording speed, the inclination of the scanning path of the reproducing head 4 is the same as the inclination of the tracks T in FIG. 2, and therefore a normal reproduced signal can be obtained by controlling the rotary phase of head 4 by means of a drum servo or a capstan servo so that the successive scanning paths of head 4 will coincide with successive tracks T on type 1. In a playback or reproducing mode employing an arbitrary tape speed which is different from the recording speed, both the phase and slant angle or inclination of the head scanning path do not coincide with the phase and slant angle, respectively, of the recorded tracks T. Some examples are shown on FIG. 2, in which dot-dash lines A, B and C respectively represent scanning paths of the head for reproducing in reverse-motion, still-motion and 2.5/1 fast-forward motion modes. Therefore, in such different or arbitrary speed reproducing modes, it is necessary to effect compensation of both the inclination and phase of the scanning path by providing a control signal to bi-morph leaf 5 to deflect the head 4 in the direction normal to the head scanning path.

Figure 3:
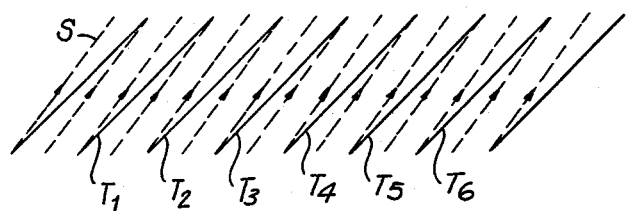
FIG. 3 diagrammatically shows recorded tracks and the head scanning path in the ½-slow reproducing mode.

FIG. 3 diagrammatically shows the tracking form for a ½-slow reproducing mode, in which a scanning path S is indicated in dotted lines and has an inclination error corresponding to $1-\frac{1}{2}=\frac{1}{2}$ pitch with respect to recorded tracks $T_1$, $T_2$, ... which are indicated in full lines. Therefore, it is necessary to effect an inclination compensation of ½ pitch during each scan of the head across the tape. In general, if the speed ratio for reproducing, that is, the ratio of the tape speed for reproducing to the recording tape speed, is assumed to be n, then the variation of such speed ratio n from the normal speed ratio 1, that is, 1−n, corresponds to the required inclination compensation in terms of the track pitch p.

Figure 2:
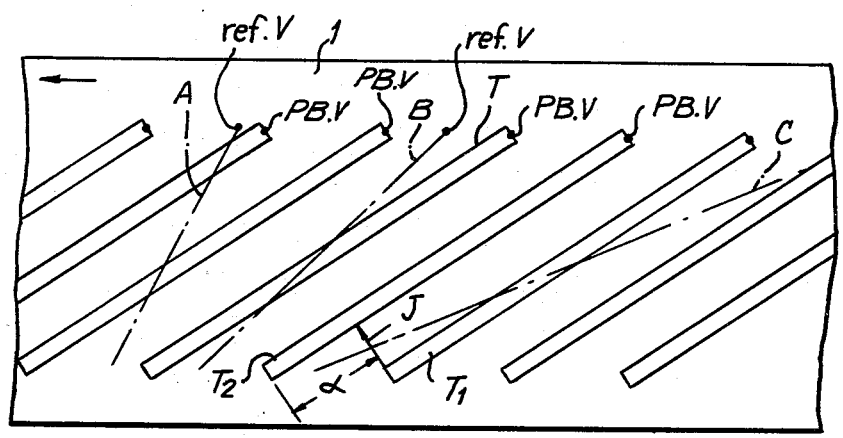
FIG. 2 is a partial plan view of a magnetic tape showing recorded tracks formed thereon by the VTR of FIG. 1.

In respect to the phase compensation, if the head 4 is to be deflected to the initial end of the nearest track T at the commencement of the scanning of the head along any one of the paths A, B and C on FIG. 2, the maximum amount of deflection of the head that may be required is ±½ pitch. Therefore, the maximum range of head deflection for phase compensation is 1 pitch.

Figure 4:
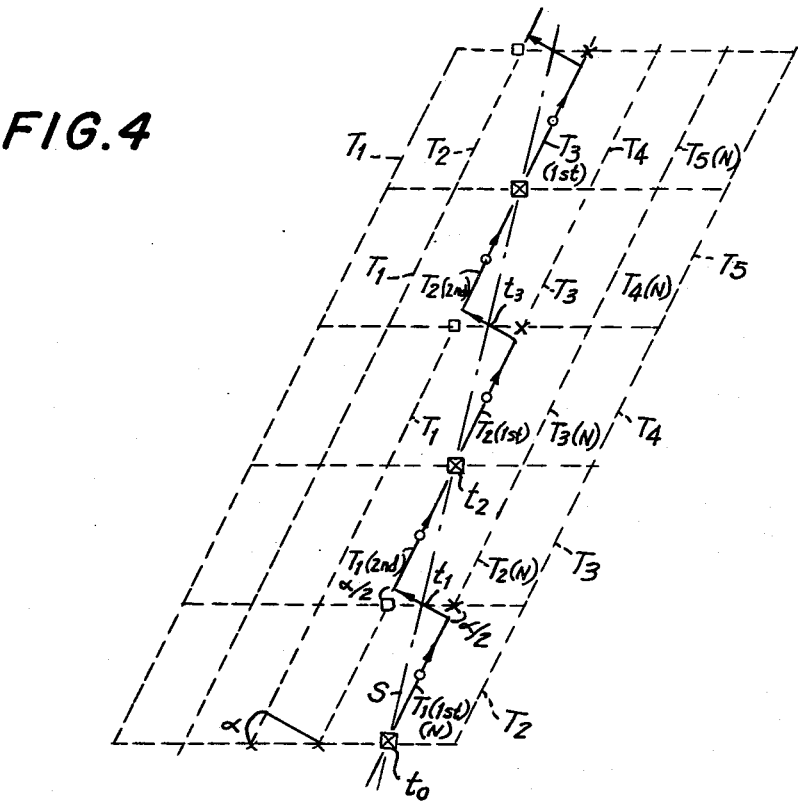
FIG. 4 is a diagram wherein the recorded tracks of FIG. 3 have been shown joined together in the scanning direction of the head.

Referring now to FIG. 4, wherein the tracks shown in FIG. 3 have been joined together in the scanning direction of the head, and in which the reference marks □ and X represent the initial and terminal ends, respectively, of each track, it will be seen that, in the normal speed reproducing mode, the tracks on the tape can be regarded as being continuous like $T_1(N)$, $T_2(N)$, $T_3(N)$, ... as viewed from the reproducing head. In the case of the ½-slow reproducing mode, since the head scanning path S has an inclination error corresponding to ½ pitch, as indicated by the dot-dash line in FIG. 4, the tracing mode for selecting the nearest track at the end of each scan is the one indicated in full lines. More particularly, as shown, each of the tracks is scanned twice in an overlapped manner, that is, $T_1(1st) \rightarrow T_1(2nd) \rightarrow T_2(1st) \rightarrow T_2(2nd) \ldots$, whereby there is obtained a ½-slow motion picture. Since, at the end of the first scanning (1st) of track $T_1$, the head is positioned at the initial end of track $T_2$, it is necessary to cause the head to jump by one pitch back to the initial end of track $T_1$. At the end of the second scanning (2nd) of track $T_1$, the head begins to scan the track $T_2$, that is, a track change is effected without jumping. Thereafter, the same tracing mode is repeated, wherein head jump and track change are performed alternately at the end of every scan.

Figure 5:
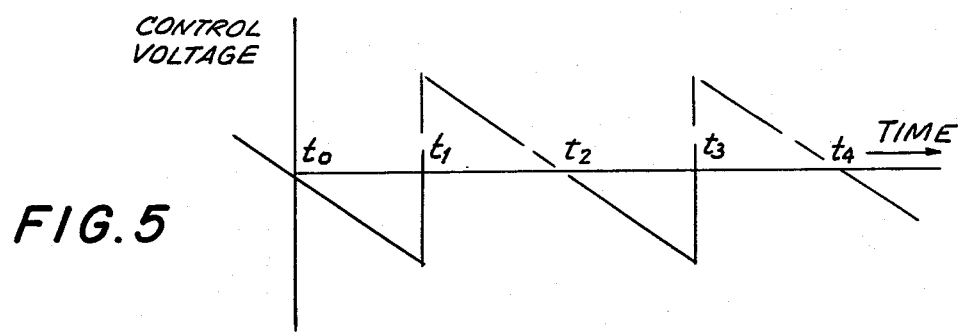
FIG. 5 graphically shows the bi-morph control voltage needed to effect the head deviation necessary to perform tracing in the ½-slow reproducing mode.

FIG. 5 illustrates the waveform of a control voltage provided to the bi-morph leaf 5 in the ½-slow reproducing mode, so as to obtain the scanning shown on FIG. 4.

Any arbitrary n-fold speed reproducing mode can be performed in an averaged manner, even when n is not an integer, by carrying out two integer-multiple speed reproducing modes determined by the integers m and m+1, respectively, in a mixed manner and each for a predetermined number of times, provided that m and m+1 satisfy the following inequality:

$$m < n < m+1 \quad (1)$$

Figure 6:
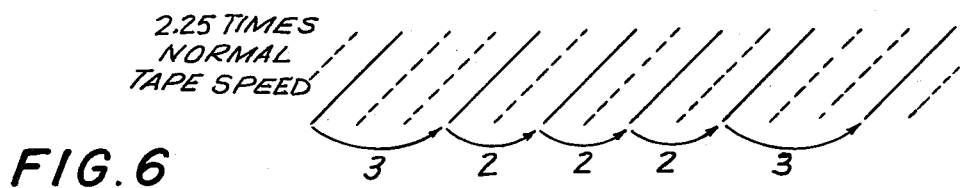
FIG. 6 diagrammatically shows the tracing form for a 2.25-fast reproducing mode.

For example, if n=2.25, then m=2 and m+1=3, and as shown in the tracing mode of FIG. 6, there is performed a fast reproducing mode of $$\frac{2 \times 3 + 3 \times 1}{3 + 1} = 2.25$$

on an average by a repeated cycle of the 2/1-fast reproducing mode three times and the 3/1-fast reproducing mode once. At the end of every scan shown with a solid line in FIG. 6, the head jumps from the terminal or concluding end of the track which has been scanned to the initial end of the next track to be scanned, so the head jump pitch is 1 pitch in the 2/1-fast reproducing period and 2 pitches in the 3/1-fast reproducing period.

In general, the tape speed ratio n in an n-fold speed reproducing mode is expressed as follows:

$$n = m \frac{M}{M+N} + (m+1) \frac{N}{M+N} \quad (2)$$

in which m and (m+1) have the meanings indicated above, M is the number of times the m-fold speed reproducing mode is repeated in each cycle, and N is the number of times the (m+1)-fold speed reproducing mode is repeated in each cycle. Further, in the case of the m-fold speed reproducing mode, the head jump pitch is (m−1) pitches while, in the case of the (m+1)-fold speed reproducing mode, the head jump pitch is m-pitches.

Figure 7:
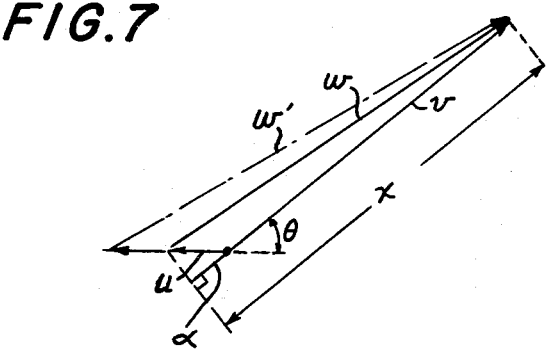
FIG. 7 diagrammatically shows the speed vector of the head and that of the magnetic tape.

Referring now to FIG. 7, in which a vector v represents the rotational speed of the head 4 and a vector u represents the tape speed and the inclination angle of the tape 1 to the rotary head drum (upper drum) 2 is assumed to be σ, then x=v+u·cos σ is the scanning speed of the head relative to the tape during the recording mode and is represented by the vector w. In other words, a recorded track is formed in the direction of the vector w.

If the tape speed u is changed from the normal recording speed in the reproducing mode, the scanning speed vector of the head is changed, both in inclination angle and in size, as indicated by the dot-dash line w′ in FIG. 7. The angular error (inclination error) is corrected by providing a ramp voltage to the bi-morph leaf 5. However, even if the tracks T are scanned correctly as a result of this correction, the error in the relative scanning speed of the head remains uncorrected since the head 4 deflects only in the direction normal to the tracks T, so that the time base of a reproduced signal varies according to the scanning error.

For example, the relative scanning speed of the head in the still reproducing mode is equal to the rotational speed v of the head and is smaller by u·cos σ than the relative scanning speed x of the head in the recording mode. This decrease corresponds to a scanning length on the tape of V·u·cos σ in one vertical scanning period (1 V), which is equal to the arrangement deviation (H- alignment α) in the scanning direction of each oblique track shown in FIG. 2 as will be apparent from FIG. 7. This length α, when distributed to the horizontal scanning periods in each track, corresponds to α/262.5, and if α is expressed in time as a multiple (for example, 2.5H) of the horizontal scanning period, the time base of each horizontal scanning period varies by α/262.5. In other words, in the still reproducing mode, the period of a reproduced horizontal synchronizing signal is shorter by $\Delta H = -\alpha 262.5$ than the corresponding period H in the normal speed reproducing mode. Similarly, in the 2/1-fast reproducing mode, the period of the horizontal synchronizing signal is increased by $\Delta H = +\alpha/262.5$ over H. Thus, the speed in a speed-varied reproducing mode can be detected as a time base variation $\Delta H$ (jitter of a reproduced signal) of the reproduced horizontal synchronizing signal.

For the same reason, the phase of a reproduced vertical synchronizing signal with respect to a reference synchronizing signal changes according to the reproducing speed. For example, the upper drum 2 shown in FIG. 1 is rotated at 60 RPS while its rotational phase is servo-controlled on the basis of a reference vertical synchronizing signal ref.V so that, for example, as shown in FIG. 2, a reference vertical synchronizing signal ref.V occurs at the terminal end of the scanning path, and a reproduced vertical synchronizing signal PB.V appears at the terminal end of each track T. In the still reproducing mode (scanning path B), the reproduced vertical synchronizing signal PB.V lags behind the reference vertical synchronizing signal ref.V by α(2.5H), and in the 2/1-fast reproducing mode (scanning path C), the signal PB.V is advanced relative to the signal ref.V by α. Of course, in the normal speed reproducing mode, the phases of signals PB.V and of ref.V are coincident with each other.

In general, the difference of a reproduced signal phase from the reference phase (hereinafter called the reproduced phase difference) at any specific point along a track is determined by the reproducing speed in use and the distance along the track in the scanning direction. For example, if the reproduced phase difference is zero at the initial end of a track in the 2/1-fast reproducing mode, there occurs a phase difference (advance) of α/2 at an intermediate point along the track and, at the terminal end of the track, there is a phase difference (advance) of 60 with respect to the reference phase.

However, the reproduced signal phase is not always coincident with the reference phase at the initial end of a track. As indicated by arrow J in FIG. 2, if a jump is effected from track T₁ to track T₂ just before the start of a scan, a phase shift (advance) of α occurs at this time. If the jumping direction is opposite to that represented by the arrow J, there is produced a phase shift of −α.

Figure 8A:
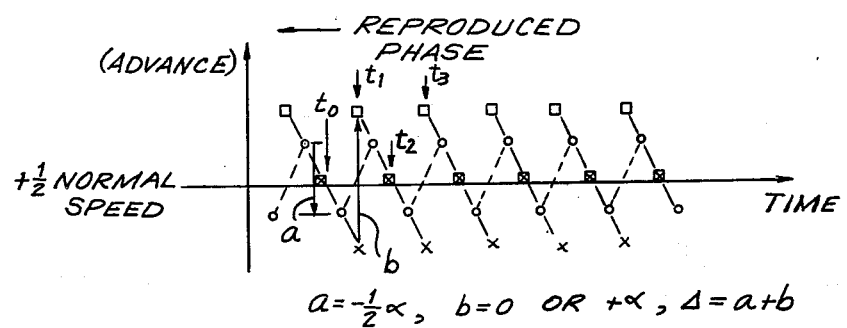
FIGS. 8A-8D graphically show changes in the reproduced phase with respect to the reference phase at the initial and terminal ends, and at the centers of the tracks in the +½-slow, +1/5-slow, +4/5-slow and +1.05-fast reproducing modes, respectively.

FIG. 8A shows changes in the reproduced phase relative to the reference phase at the initial end □ of a track, at the terminal end X of the track and at the center of the track in the ½-slow reproducing mode. This graph can be prepared by reference to FIG. 4; that is, at the end t₁ of the first scan of track T₁, the reproduced phase at the terminal end X of the track lags by ½α relative to the reference phase, and then, by a 1-pitch jump at the end t₁ of the first scan the head is deflected by +½ pitch, so that at the start of the second scan of track T₁, the reproduced phase at the initial end □ of the track advances by ½α. Then, at the end t₂ of the second scanning of track T₁, the scanning path coincides with the terminal end X of track T₁ and with the initial end □ of track T₂, so that the reproduced phase difference becomes zero. Thereafter, the same phase variation is repeated, as shown on FIG. 8A. It will be appreciated that the phase variation shown in FIG. 8A generally corresponds to the variation of control voltage shown on FIG. 5.

The reproduced phase at the center O of a track is intermediate the phases at the initial end □ and the terminal end X of that track. In FIG. 8A, the phase variation a between the reproduced phases at the centers O of successive tracks when there has been no head jump between such tracks, is $-\frac{1}{2}\alpha$ (the "−" sign indicates a variation in the negative direction). As can be seen from FIG. 4, such phase variation a corresponds to an inclination compensation between the track and the scanning path. In an n-fold speed reproducing mode, in general, the inclination error is n−1 pitch, so there occurs the following phase variation (unit: horizontal period H):

$$a = (n-1)\alpha \tag{3}$$

The phase variation a in equation (3) occurs regularly on the basis of an inclination error regardless of jump. The reproduced phase undergoes the phase variation a of equation (3) at every scanning, not only at the centers of successive tracks, but also at any other specific points of the successive tracks.

The step amount b of the reproduced phase, that is, the phase change in going from the terminal end X of one scanned track to the initial end □ of the next scanned track, in the ½-slow reproducing mode (FIG. 8A), is α when a head jump occurs and zero when there is no head jump.

In general, as previously noted, a small jump of m−1 pitch and a large jump of m pitch are carried out in a mixed manner, so that the phase step amount b is expressed as:

$$b = -(m-1)\alpha \tag{4a}$$

or $$b = -m\alpha \tag{4b}$$

The "−" sign indicates that a jump is made in a direction opposite to the direction of the phase variation n.

The phase variations $\Delta$ or $\Delta'$ from the center O of one scanned track to the center O of the next scanned track with small or large head jump, respectively, between such tracks is as follows:

$$\Delta = a + b = (n-m)\alpha \tag{5a}$$

$$\Delta' = (n-m-1)\alpha \tag{5b}$$

Thus, the reproduced phase at the track varies at every scanning by $\Delta$ (in the case of a small head jump) corresponding to the fraction (n−m) of the reproducing speed ratio n, and by $\Delta'$ (in the case of a large head jump) corresponding to the fraction minus one, (that is, n−m−1). From equations (5b) and (5b), it is determined that:

$$\Delta \geq O \tag{6}$$

$$\Delta' = \Delta - \alpha \leq O \tag{7}$$

and $$|\Delta|+|\Delta'|=\alpha \tag{8}$$

Figure 9A:
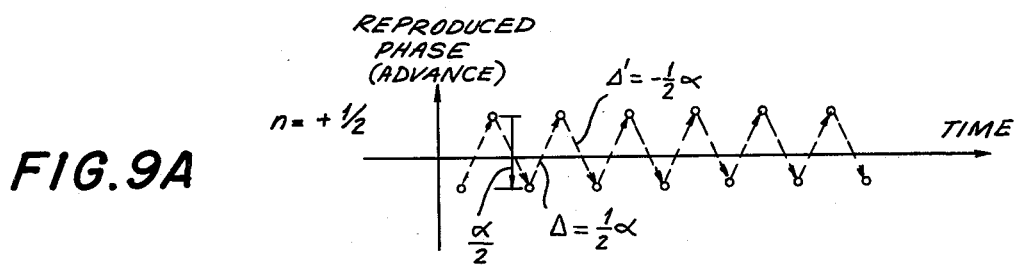
FIGS. 9A-9D graphically show changes in the reproduced phase only at the track centers in FIGS. 8A-8D, respectively.

FIG. 9A is a graph wherein only phase variations at the centers ○ in FIG. 8A have been extracted. In the ½-slow reproducing mode, phase variations of $\Delta=\frac{1}{2}\alpha$ and $\Delta'=-\frac{1}{2}\alpha$ are shown to occur alternately for successive scannings.

Figure 8B:
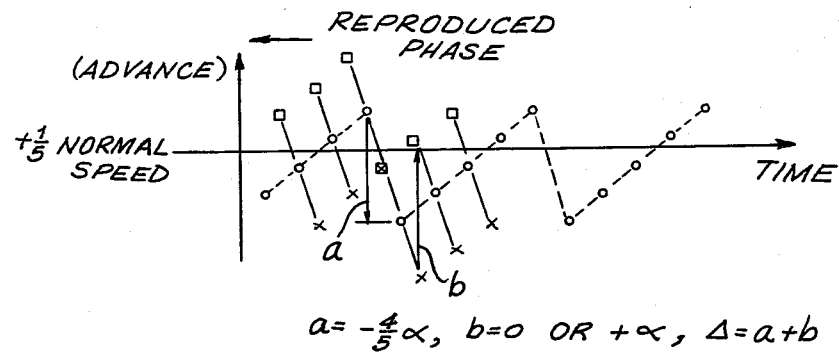
Figure 8C:
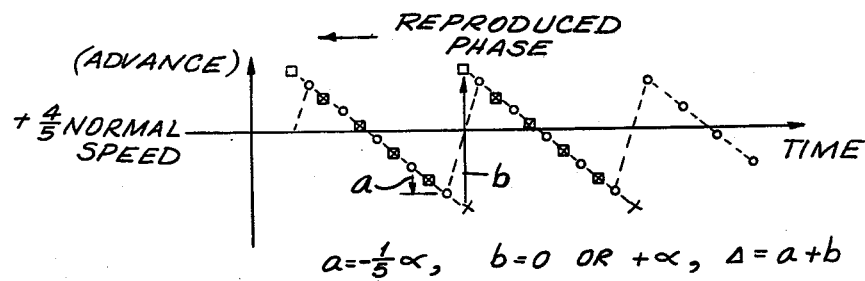
Figure 8D:
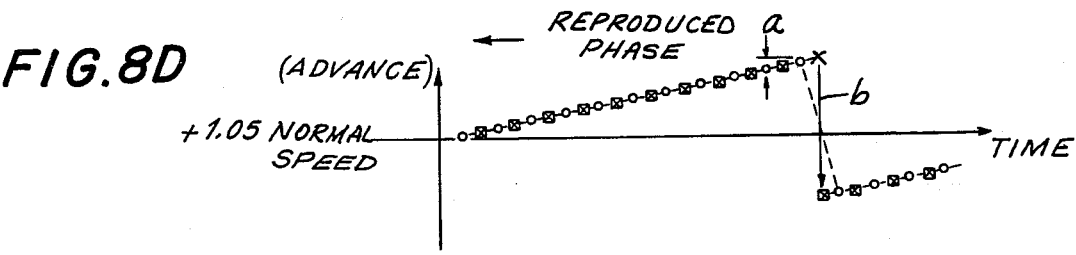
Figure 9B:
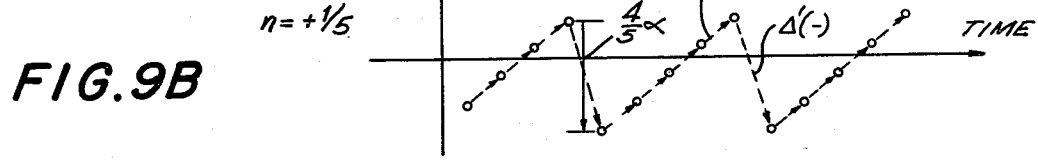
Figure 9C:
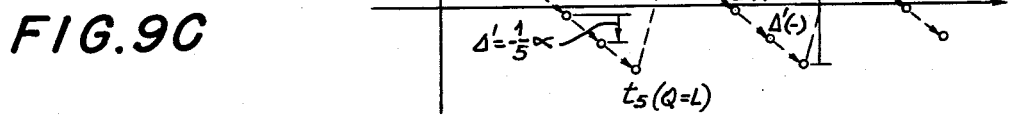
Figure 9D:
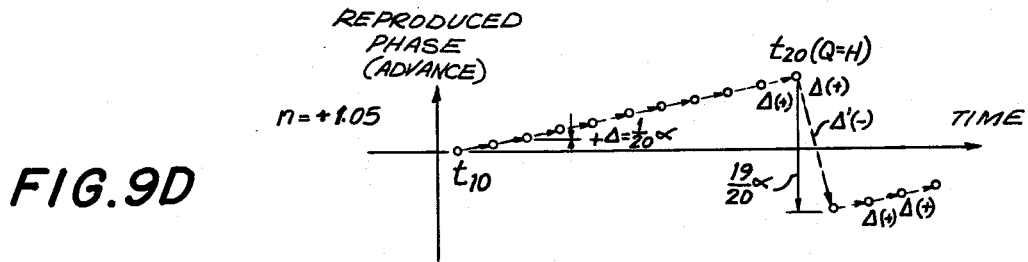

By referring to FIGS. 8B through 8D, phase variations at the initial ends □, terminal ends X and centers ○ of successive tracks will be seen for the +1/5-slow, +4/5-slow and +1.05-fast reproducing modes, respectively. Similarly, FIGS. 9B through 9D graphically show only phase variations at the track centers of FIGS. 8B through 8D, respectively. In the +1/5-slow reproducing mode of FIG. 8B, since a $=-4/5\alpha$ and b= ○ or +α, there occurs at every scanning a phase variation of $\Delta=+1/5\alpha$ or $\Delta'=-4/5\alpha$ at the track center as shown in FIG. 9B. In the +4/5-slow reproducing mode of FIG. 8C, since a=$-1/5\alpha$ and b= ○ or +α, there occurs at every scanning a phase variation of $\Delta=+4/5\alpha$ or $\Delta'=-1/5\alpha$ at the track center as shown in FIG. 9C. In the +1.05-fast reproducing mode of FIG. 8C, since a $=+1/20\alpha$ and b=0 or −α, there occurs at every scanning a phase variation of $\Delta=+1/20\alpha$ or $\Delta'=-19/20\alpha$ at the track center as shown in FIG. 9D.

Figure 10:
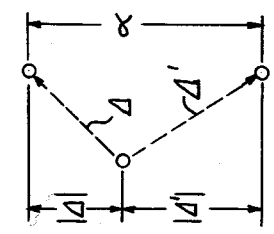
FIG. 10 is a phase variation graph illustrating that the phase variation at the track center is within α.

From FIGS. 9A through 9D it is seen that the reproduced phase variation from the reference phase at the track center ○ is within +α (or ±α/2). This can be understood from equations (6), (7) and (8). More particularly, from equations (6), (7) and (8) it is seen that Δ and Δ' are of opposite polarities and that the sum of their respective absolute values is α. As shown in FIG. 10, when the reproduced phase on scanning a track center ○ is a certain phase, the phase on the next scanning of a track center changes by Δ or Δ'. No matter which phase change may occur, the phase at next scanning of a track center is within the phase difference of α. The foregoing is because, when the phase variation Δ has occurred, if it is possible to forecast that the reproduced phase at the next scanning of a track center will go beyond the range of α, it is proper to perform a head jump which produces the phase variation Δ'. The reverse is also true.

Generally, it can be said that the variation of a reproduced phase from the reference phase for successive scans of any specific point on a track is within +α. This can be easily understood from the fact that the same specific points on a number of tracks are on a line parallel to a line passing through the track centers ○. Therefore, if only phase variation components only at the initial ends □ or terminal ends X of the tracks in FIGS. 8A through 8D are considered, such phase variations will be within the variation range of +α.

The conditions for an optimum tracing control will now be deduced.

As shown in equation (2) above, an arbitrary n-fold speed reproducing mode can be expressed in an average manner by performing m-integer multiple reproducing and (m+1)-integer multiple reproducing (m<n<m+1) M and N times, respectively. In this case, if M/N is an integer, for example, n=1.5, m=1, m+1=2, M=1, N=1, equation (2) represents an optimum tracing mode. When M/N is not an integer, the equation (2) does not always represent an optimum tracing form or mode.

For example, if n=2.03=2×(97/100)+3×(3/100), equation (2) can be decomposed into a tracing form consisting of the 2/1-fast reproducing (one track skip) mode 97 times and the 3/1-fast reproducing (two tracks skip) mode 3 times. In this case, however, since the 3/1-fast reproducing mode is performed 3 times after performing the 2/1-fast reproducing mode 97 times, the dispersion or fluctuation of the reproduction picture speed is abnormally large. More particularly, the 3/1-fast reproducing mode occurs only for an extremely short period, and the greater part of the reproducing mode is occupied by the 2/1-fast reproducing mode, which substantially does not correspond to the 2.03-fast reproducing mode.

Therefore, equation (2) may be further decomposed so that arbitrary tape speed ratio n may be expressed as follows:

$$n = \frac{N - \sum\limits^{Y(\text{time})}}{} \left( m \frac{L}{M+N} + (m+1)\frac{1}{M+N} \right) + \tag{9}$$

$$\sum\limits^{Y(\text{time})} \left( m \frac{L+1}{M+N} + (m+1)\frac{1}{M+N} \right)$$

The above equation (9) means that a sequence of an m-fold speed reproducing mode effected L times and an (m+1)-fold speed reproducing mode effected 1 time is repeated (N-Y) times and that, thereafter, a sequence of an m-fold speed reproducing mode effected (L+1) times and an (m+1)-fold speed reproducing mode effected 1 time is repeated Y times.

For example, in the case of the 2.03/1-fast reproducing mode, $$n = 2.03 = \sum\limits^{2 \text{ times}} \left( 2 \times \frac{32}{100} + 3 \times \frac{1}{100} \right) +$$

$$\sum\limits^{1 \text{ time}} \left( 2 \times \frac{33}{100} + 3 \times \frac{1}{100} \right)$$

Therefore, a sequence of a 2/1-fast reproducing mode effected 32 times and a 3/1-fast reproducing mode effected 1 time is repeated twice and followed by a single sequence of a 2/1-fast reproducing mode effected 33 times and a 3/1-fast reproducing mode effected 1 time. In the foregoing case, (N−Y)/Y is an integer (=2). However, when (N−Y)/Y is not an integer, equation (9) does not represent a tracing from with the least possible fluctuation of the reproduction picture speed. For example, in the case of n=1.49, it is necessary to further smooth the fluctuation, as follows:

$$n = \frac{1}{M+N} \left( \sum\limits^{(Y-P) \text{ time}} [K\{(m \times L) + (m+1)\} + \right. \tag{10}$$

$$\{m(L+1) + (m+1)\}] + \sum\limits^{P \text{ time}} [(K+1)\{(m \times L) +$$

$$\left. (m+1)\} + \{m(L+1) + (m+1)\}] \right)$$

where
m<n<m+1
M>N
L<(M/N)<L+1
M−LN=Y $K < [(N-Y)/Y] < K+1$
$P = N - Y - KY$

If $(Y-P)/P$ is not an integer, then equation (10) above may be further decomposed to smooth the fluctuation of the reproducing speed.

Through such equational decompositions, the following conditions or characteristics can be presumed for the final tracing form:

(a) The difference in jump pitch between adjacent tracks to be scanned or traced is not more than 1;

(b) The difference in the total amount of jump between two small blocks each consisting of any same number of tracks to be scanned is also not more than 1;

(c) The difference in the total amount of jump between two medium blocks each consisting of any same number of the above small blocks is also not more than 1;

(d) The difference in the total amount of jump between two large blocks each consisting of any same number of the above medium blocks is also not more than 1; and so forth.

A tracing form with the above characteristics is an optimum form with a minimum dispersion of the reproducing picture speed. This optimum form may be re-expressed with respect to the phase variation of a reproduced signal from the reference signal, by saying equivalently that the variation of a reproduced phase from the reference phase at any specific point on a track is within $+\alpha$(1 pitch).

For example, when $n=2.03$, as in the previously noted example, if a 2/1-fast reproducing mode (one track skip) and a 3/1-fast reproducing mode (two tracks skip) are performed in the following manner:

$$\underbrace{222\ldots222}_{97 \text{ times}}\underbrace{333}_{3 \text{ times}}$$

then, since the phase variation $\Delta'$ at every tracing in the 3/1-fast reproducing mode is $(n-m-1)\alpha$, as in equation (5), $\Delta' = -0.97\alpha$, and when tracing is performed 3 times, $3\Delta' = -2.91\alpha$ and thus the phase variation unsatisfactorily exceeds $1\alpha$.

On the other hand, if tracing is performed in the following manner, the phase variation at every scanning of a specific point on a track is within $\alpha$:

$$\underbrace{222\ldots23}_{32 \text{ times}}\underbrace{222\ldots23}_{32 \text{ times}}\underbrace{222\ldots23}_{33 \text{ times}}$$

This tracing form satisfies the foregoing conditions (a), (b) and (c).

Thus, it follows that, in the optimum tracing form, the fluctuation of a reproduced phase at a specific point on a track is within $\alpha$(1 pitch). This variation of a reproduced phase at a specific point on a track is assumed to be y component $(0 \leq y \leq \alpha)$.

If the above specific point on a track is assumed to be the initial end of the track, then, on the basis of equation (3), at the terminal end of the track, there is a phase variation $(n-1)\alpha$ which may be assumed to be x component. The maximum conceivable amount of phase variations at all points on the track becomes the sum of the components x and y, which may be expressed as follows:

$$(y+|x|)_{max} = \{1+|(n-1)|\}\alpha \tag{11}$$

Figure 11:
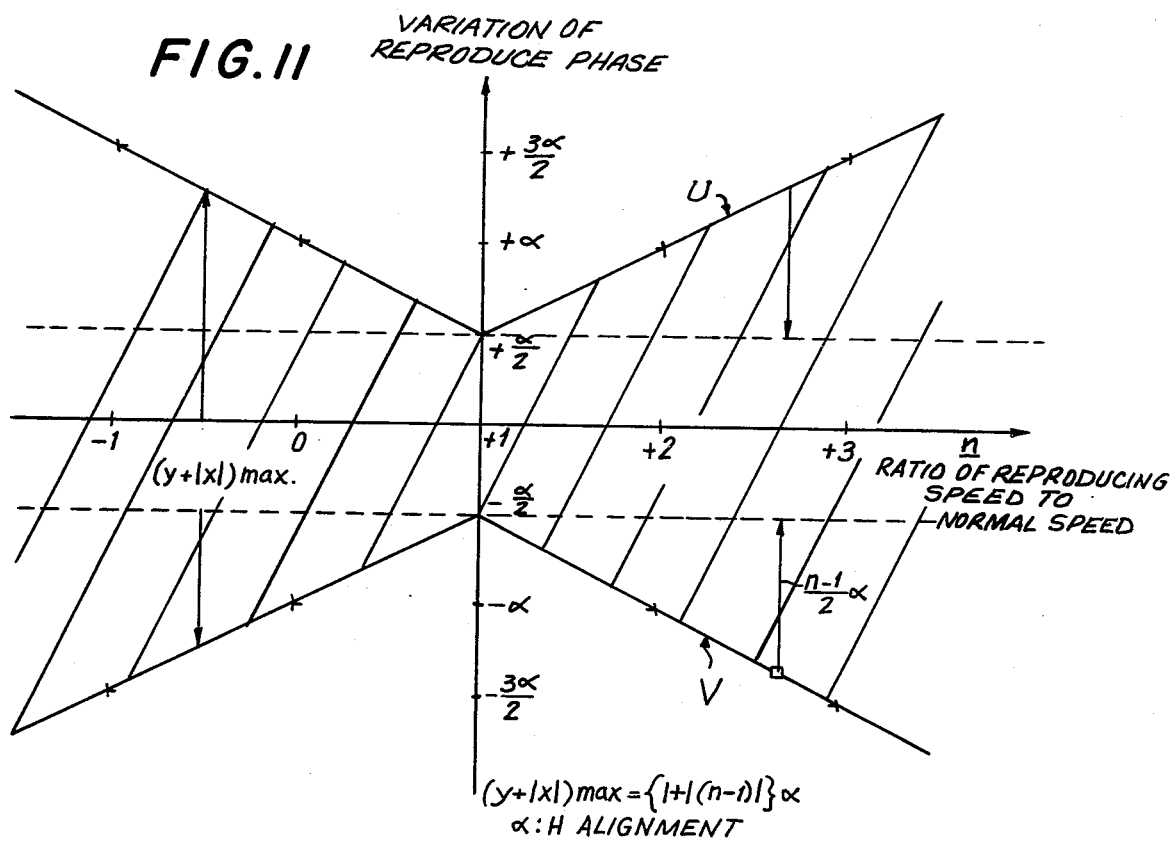
FIG. 11 graphically shows the maximum possible amount of phase variation at all points on the track.

The maximum phase variation according to the equation (11) is shown symmetrically distributed on FIG. 11. While tracing according to the optimum form is performed, the reproduced phase at all points on a track must be within the range of the hatching shown in FIG. 11.

As set forth hereinbefore, since the phase variation at a specific point on a track is within $\alpha$, the phase at a specific point on a track can be presumed to be inside the dotted $\pm\alpha/2$ lines in FIG. 11. As a maximum condition of phase variation, if the case is considered where the terminal end and the initial end of a track indicated at X and □, respectively, lie on the boundary lines U and V in FIG. 11, the phase distances from these points X and □ to the $\pm\alpha/2$ dotted lines are each $[(n-1)/2]\alpha$. Since $[(n-1)/2]\alpha$ corresponds to $-\frac{1}{2}$ of a phase variation based on an inclination compensation in one scanning, it is seen that the foregoing specific point on the track must be the track center. Therefore, it will be appreciated that, when reproduced phases at all points on a track are within the range of boundary lines U and V on FIG. 11, the reproduced phase at the track center is within the range of boundary lines $J(+\alpha/2)$ and $K(-\alpha/2)$ in FIG. 12. In other words, it is a condition of optimum tracing to effect jump control so that the reproduced phase at the track center is within the range between lines J and K on FIG. 12.

Now, the method of selecting either large or small jumps for the optimum tracing form will now be studied by observing the reproduced phase at the track center with respect to the reference phase. As previously noted, the reproduced phase at the track center changes in the positive direction by $\Delta = (n-m)\alpha$, in the case of a small jump, and changes in the negative direction by $\Delta' = (n-m-1)\alpha$, in the case of a large jump. Considering a point P, which has declined by $\Delta$ from the upper boundary line J in FIG. 12, at a desired reproducing speed n, it will be apparent from equation (8) that a point which has risen by $\Delta'$ from the lower boundary line K will coincide with the point P.

If a reproduced phase $\phi$ relative to the reference phase at the track center is below the point P (lagging phase), a small jump should be performed so that the phase variation of $\Delta$ will occur in the next scanning, whereby the reproduced phase $\phi$ does not go beyond the upper boundary line $J(+\alpha/2)$. If the reproduced phase $\phi$ at the track center is above the point P (advanced phase), a large jump should be performed so that the phase variation of $\Delta'$ will occur in the next scanning, whereby the reproduced phase does not go beyond the lower boundary line $K(-\alpha/2)$. Thus, by judging the jump condition on the basis of the point P, it is possible to effect optimum tracing.

Figure 12:
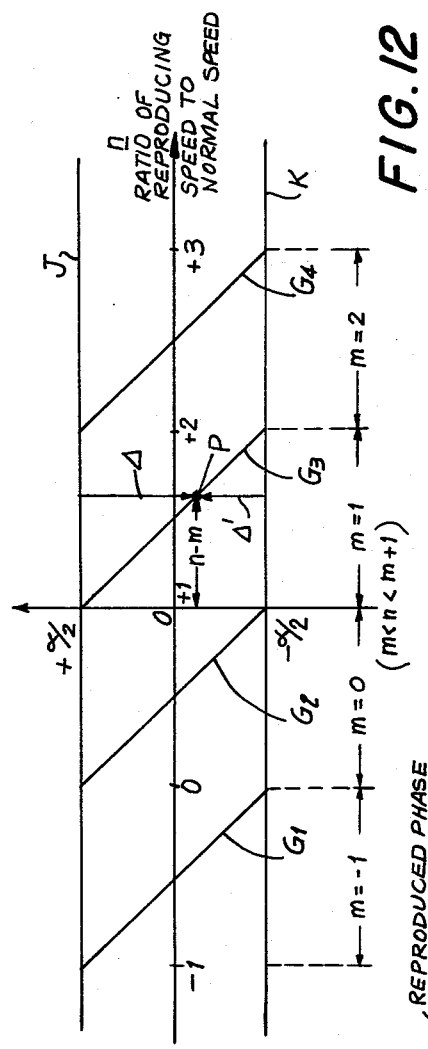
FIG. 12 graphically shows the range of variation of the reproduced phase at the track center and boundary lines for jump control in the case of optimum tracing.

The trajectory of the point P with varying n provides a group of straight lines $G_1, G_2, G_3, G_4$ in FIG. 12. These straight lines are expressed as follows:

$$\phi = +\frac{\alpha}{2} - \Delta = -n\alpha + \left(m + \frac{1}{2}\right)\alpha \tag{12}$$

($m$ is an integer, $m < n < m+1$)

Thus, $$G_1: \phi = -n\alpha - \frac{1}{2}\alpha \quad (13)$$

$$G_2: \phi = -n\alpha + \frac{1}{2}\alpha \quad (14)$$

$$G_3: \phi = -n\alpha + \frac{3}{2}\alpha \quad (15)$$

$$G_4: \phi = -n\alpha + \frac{5}{2}\alpha \quad (16)$$

With these straight lines $G_1$–$G_4$ as condition judging boundary lines, control of the amount of jump (large jump or small jump) is effected so as to perform an optimum tracing.

The phase of a point P on the boundary lines $G_1$–$G_4$ in FIG. 12 can be obtained by delaying the phase of $+\alpha/2$ by $\Delta=(n-m)\alpha$. The phase of $+\alpha/2$ is given with respect to the reference phase represented by the origin of the coordinates on FIG. 12 and which is provided from an external reference signal source. Since $(n-m)$ corresponds to a fraction $l$ of the reproducing speed ratio n, the required amount of delay $\Delta$ can be obtained by detecting the reproducing tape speed. Thus, the phase of the reference point P for judging the required amount of head jump can be determined by the fraction $l$ of the scale n of the abscissa in FIG. 12. The phase of the judgment base point on each of the boundary lines $G_1$–$G_4$ in FIG. 12 is determined by only the fraction $l$ regardless of the integer m of the speed ratio n, and in any integer-multiple speed range the phase of the jump judging base point can be calculated from the same fraction data $l$. Therefore, there may be provided a commonly used jump amount judging circuit unit for selecting a large or small head jump in correlation only with the fraction data $l$ ($0<l<1$) for all of integer-multiple speed range.

Figure 13:
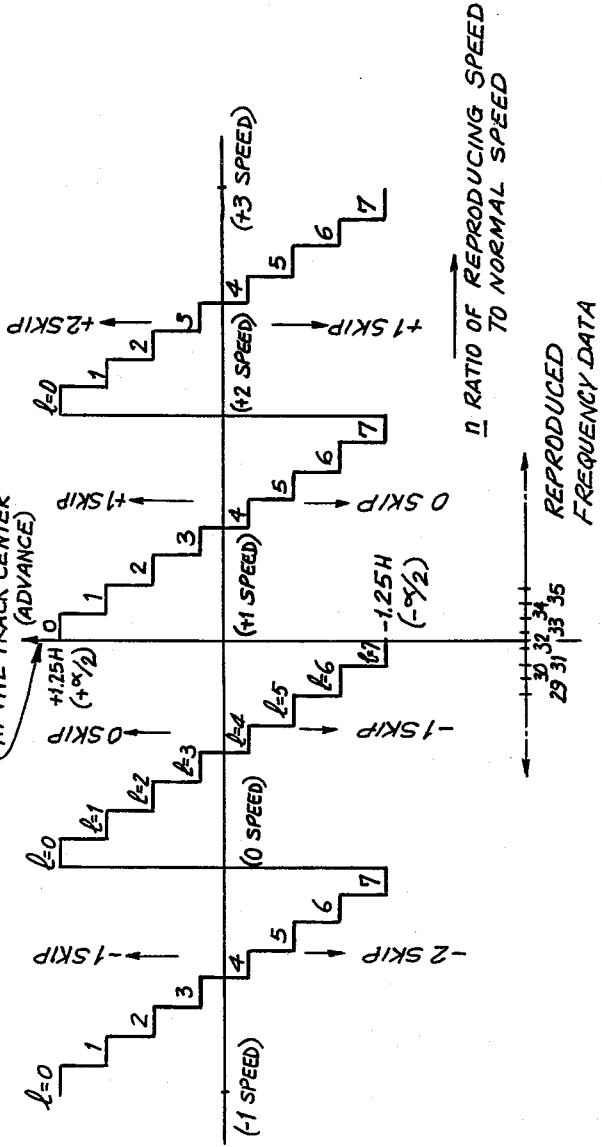
FIG. 13 is a quantized graph derived from the graph of FIG. 12.

FIG. 13 is a quantized version of the boundary line graph of FIG. 12, in which the fraction $l$ is represented bu 0 to 7 (3 bits). Once the value of $l$ is obtained, the phase in each quantizing step can be obtained by delaying by $1\times(2.5/7)\alpha$ from $+\alpha/2$ or $+1.25H$. In each integer-multiple speed range, only the amount of head jump or skip differs, and the basic phase for jump condition judgment can be treated with exactly the same conditions. If a reproduced phase at the track center is above the step line in FIG. 13, a large jump (skip of m tracks) is performed, whereas, if the reproduced phase at the track center is below the step line, a small jump (skip of m−1 tracks) is performed. The fraction data $l$ and the speed range data m can be obtained by detecting variation of the frequency of a reproduced horizontal synchronizing signal from a standard value for normal reproduction.

Since the video tracks T are formed obliquely on the tape, a deviation of the reproducing tape speed from a reference speed appears as a variation of reproduced horizontal periods, as already mentioned. For example, in the still reproducing mode (n=0), a reproduced vertical synchronizing signal varies in time base (or phase) from that for the normal reproducing mode by a time corresponding to H-alignment $\alpha$ (1 pitch), which corresponds to a variation of the horizontal scanning period of $\Delta H = -\alpha/262.5$. Of course, when n=1, that is, in the normal reproducing mode, $\Delta H=0$, and, when n=2, $\Delta H=+\Delta/262.5$. The value of $\Delta H$ can be known by counting with clock pulses a reproduced horizontal period or a whole or integer multiple thereof. For example, as shown in FIG. 13, the variation in reproduced frequency at the reproducing tape speed ratio n of −1 to +3 can be represented by counting values of 0 to 64 with a central value assumed to be 32 for n=1.

Figure 14:
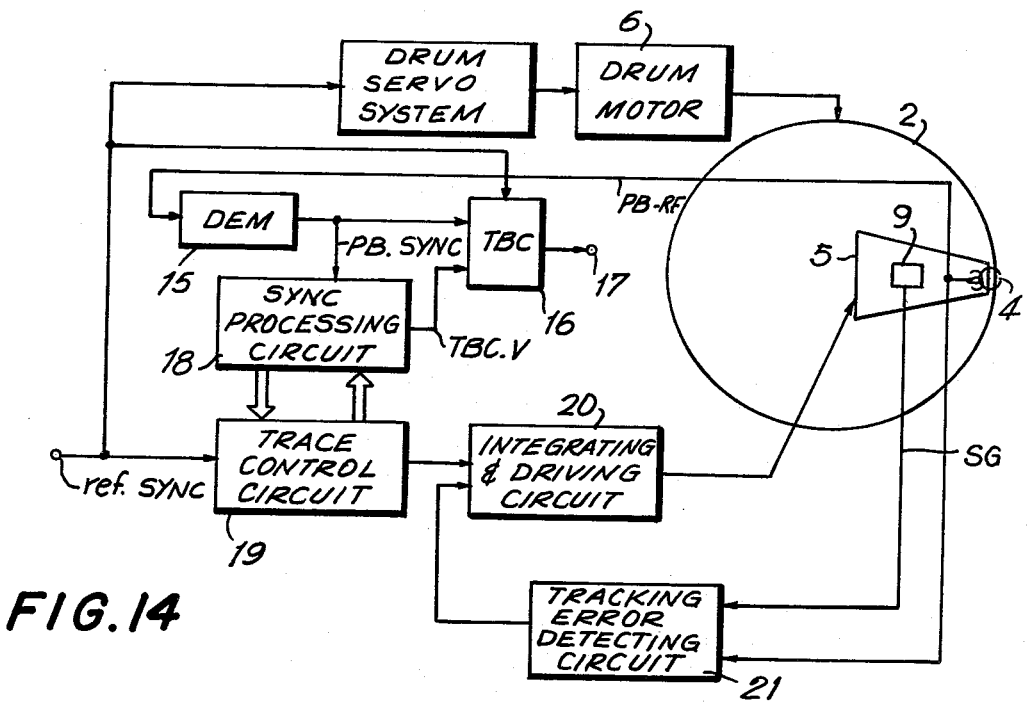
FIG. 14 is a block diagram of a tracking servo system in a VTR according to an embodiment of this invention.

Referring now to FIG. 14, it will be seen that a tracking servo system for a VTR to which this invention is applied has a terminal 13 to which there is fed a reference synchronizing signal ref. SYNC from an external reference signal source. This reference synchronizing signal is applied from terminal 13 to a drum servo system 14 for causing drum motor 6 to be rotated at 60 Hz or RPS in synchronism with the reference vertical synchronizing signal ref. V. included in ref. SYNC. The head 4 attached to the free end of bi-morph leaf 5 has its reproduced output PB-RF (FM signal) applied to a demodulator 15 in which it is demodulated to a reproduced video signal. The reproduced video signal has its time base corrected by a time base corrector 16 and then is made available at an output terminal 17.

A reproduced synchronizing signal PB. SYNC contained in the output of demodulator 15 is applied to a processing circuit 18 which forms synchronizing signals necessary for a trace control circuit 19 and a synchronizing signal TBC. V necessary for time base corrector 16. As will appear hereinafter, trace control circuit 19 provides a jump signal necessary for optimum tracing and an inclination error correcting signal on the basis of the reference synchronizing signal ref. SYNC fed from terminal 13 and the reproduced synchronizing signal fed from the sync processing circuit 18. The output of trace control circuit 19 is converted in an integrating and driving circuit 20 into a jump voltage and an inclination compensation voltage which are fed to bi-morph leaf 5, whereby the position of magnetic head 4 is controlled to effect tracing control according to the reproducing speed ratio n. The reproduced output PB-RF of magnetic head 4 and the output SG of strain gauge 9 on bi-morph leaf 5 are fed to a tracking error detecting circuit 21 which may be similar to that disclosed in applicant's co-pending U.S. patent application Ser. No. 06/152,117 filed May 21, 1980 now U.S. Pat. No. 4,361,857, and having a common assignee herewith, and which, on the basis of the signals PB-RF and SG, forms a tracking error signal according to the discrepancy between the track and the scanning path. The tracking error signal is fed to bi-morph leaf 5 through integrating and driving system 20 whereby the tracking error is corrected.

Figure 15:
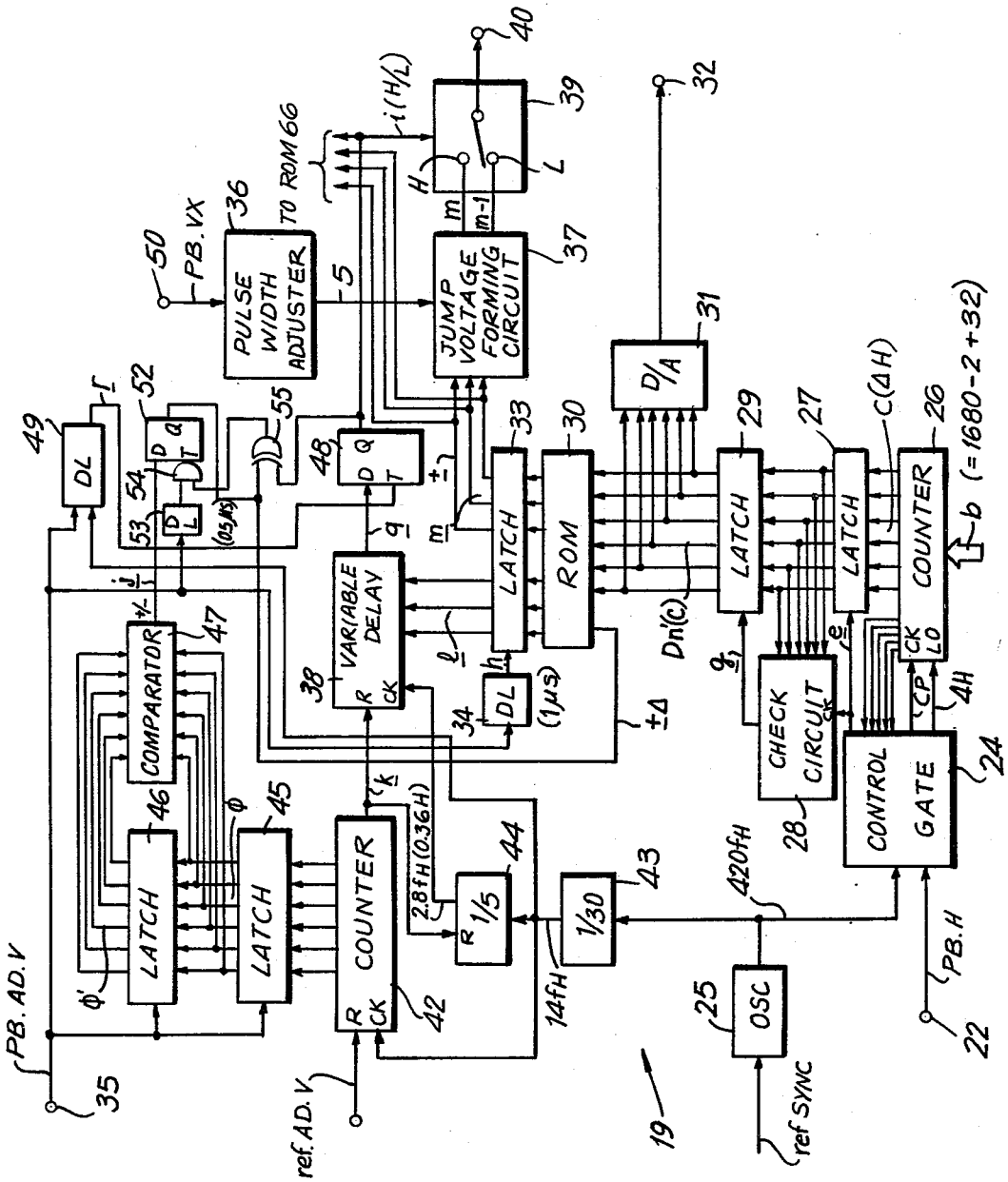
FIG. 15 is a block diagram of a trace control circuit included in the system of FIG. 14.

The trace control circuit 19 is shown on FIG. 15 to have a reproduced horizontal synchronizing signal PB. H fed from a terminal 22 to a control gate 24 which also receives clock pulses, at a frequency (420 $f_H$) 420 times the horizontal frequency $f_H$, from a clock oscillator 25 which is gen-locked to the reference synchronizing signal ref. SYNC. In control gate 24, there is formed a load pulse with a period (4H) four times the horizontal period on the basis of the reproduced horizontal synchronizing signal PB. H.

This load pulse is fed to a load input LO of a counter 26 which is thereby loaded to preset data b ($=1680-2+32=1710$) at every four horizontal periods. Counter 26 counts down a clock pulse CP (420 $f_H$) from such preset data. Therefore, at the output of counter 26 there is obtained a counting value c containing data of the variation $\Delta H$ of the horizontal period just before the next generation of a load pulse. When the reproducing tape speed ratio n changes by 1 from the normal value of n=1, as previously noted, the reproduced horizontal period varies by ΔH=α/262.5. Therefore, the correlation between n and the counting value c of counter 26 is expressed as follows, assuming α=2.5H:

$$\frac{262.5}{262.5 + 2.5(n-1)} = \frac{1680 - (c - 32)}{1680} \quad (17)$$

Data of n and c obtained from equation (17) are tabulated below. Since c is a counting value, it is actually an integer value.

TABLE

| n | −1 | 0 | +1 | +2 | +3 |
|---|---|---|---|---|---|
| c | 0.62 | 15.85 | 32.00 | 47.85 | 63.40 |

Thus, c=32 at the normal speed (n=1), and c varies from 0 to 64 in the speed range of n=−1∼+3.

The 6-bit output c of counter 26 is fed to a latch circuit 27 and is latched with a latch pulse e supplied from control gate 24. The output of latch circuit 27 is representative of the reproducing speed ratio n. The control gate 24, as mentioned above, not only controls the preset, counting, count stop and data transfer of counter 26, but also functions to exclude an abnormal counting value upon receipt of the upper bits output of counter 26. The offset value of "−2" in the preset data b for counter 26 is added to compensate for the required time for the preset of counter 26 and the operation of latch circuit 27.

The output of the latch circuit 27 is fed to a check circuit 28 which compares two successive output data of latch circuit 27 at every 4H. If the difference between two successive data from latch circuit 27 is extremely large, check circuit 28 regards it as erroneous information, such as drop-out, and stops its transfer to another latch circuit 29. When check circuit 28 judges the data to be normal, the output of latch circuit 27 is fed through latch circuit 29 to ROM 30 and a D/A converter 31 by means of a latch pulse g from check circuit 28.

The D/A converter 31 forms a track inclination compensation voltage corresponding to (n−1) pitch on the basis of a speed data output Dn from latch circuit 29. When Dn=32 (normal speed), this compensation voltage is zero. The voltage output of D/A converter 31 is fed from a terminal 32 to bi-morph leaf 5 via integrating and driving circuit 20 (FIG. 14), whereby the inclination error between the track and the scanning path is corrected.

The speed data output Dn of latch circuit 29, which contains information on the fraction portion 1 (n−m) and the integer portion m of the reproducing speed ratio n, is fed to ROM 30, where it is divided into the fraction 1 and the integer m.

FIG. 16 graphically shows the relationship between the output Dn of latch circuit 29, that is, the counting value c of counter 26, and the fraction data 1 and integer data m. A problem is encountered in extracting the fraction 1 from the speed data Dn when the speed ratio n is a value near to an integer. As is apparent from equation (17), the counting value c and the speed ratio n are not in a completely linear proportional relation, but rather are in a functional relation having a very small curved portion. There also is a quantizing error in counter 26. Consequently, as shown on the central portion of FIG. 13, it is impossible to judge whether n>+1 or n<+1 at both sides of the +1− normal reproducing line at c=32. For example, when c=33, there actually can occur the case of n<+1.

Therefore, by considering the polarity of phase variation Δ (or Δ′) with respect to the reference phase at a specific point on a track, it is judged in which direction (right or left) of the point of an integer value the actual data n occurs. As is seen from the case of n=1.05 in FIG. 9D, when n is near the boundary of an integer value, the phase variation Δ at every tracing is very small, and this very small phase variation is repeated many times, twice or more. In the case of FIG. 9D, the phase variation of Δ=n−m=+0.05α (positive) is repeated about 20 times and then the phase variation of Δ′=n−m−1=−0.95α (negative) occurs once. Thus, the polarity of most of the phase variation is plus, from which it is seen that n>+1. Similarly, in the case of n=+4/5 in FIG. 9C, the phase variation of Δ′=−1/5α (negative) is repeated four times and then the phase variation Δ=4/5α occurs once. From this negative phase variation it is seen that n<+1.

In this way the phase variation Δ or Δ′ at a specific point on a track is detected, and in case n is near an integer multiple speed, the fraction 1 and the integer m are determined with priority given to the polarity of phase variation (±Δ), as shown in FIG. 16. For example, when n=1.05, the counting value c of counter 26 should be 33 from equation 17, but even when wrong data, such as c=31 due to a measurement error, are obtained, there is provided such data processing as to obtain the correct fraction 1=0 on the basis of the polarity detection. However, the phase jump of Δ′=−0.96α, which is shown to be performed once every twenty times in FIG. 9D, is an erroneous judgment. To prevent such erroneous judgment, for α/3 or larger phase jumps, the polarity detection of α may be stopped and the previous detection results may be retained. Specific means for preventing such an erroneous judgment will be described hereinafter.

The correlation of c with 1 and m shown in FIG. 16 is stored in ROM 30. Therefore, by providing the 6-bit speed data Dn (counting value c) and the 1-bit polarity data ±Δ of phase variation to ROM 30 as address inputs, there are obtained 3-bit fraction value data 1 (=0∼7) and 3-bit integer value data m (speed range data=−1, 0, +1, +2) with one bit of the data m being used as a sign bit (±). The output of ROM 30 is fed to a latch circuit 33 and is latched with a latch pulse h which is obtained from a delay circuit 34 delaying, by about 1 μs, a reproduced vertical synchronizing signal PB.AD.V of advance pulse (123H advance) from a terminal 35. As a result, the output of ROM 30 is fixed to latch 33 by synchronizing signal PB.AD.V after obtaining the polarity data ±Δ of phase change.

The output m of latch circuit 33 is fed to a jump voltage forming circuit 37, while output 1 of latch circuit 33 is applied to a variable delay circuit 38. The variable delay circuit 38, which may be a counter, is provided for forming the phase of the stepped boundary lines for jump condition judgment shown in FIG. 13. The jump voltage forming circuit 37 forms jump voltages corresponding to m jump (large jump) and (m−1) jump (small jump) on the basis of the speed range data m fed from latch circuit 33. The jump voltages are formed in a predetermined jump period after the end of each scanning or tracing. This jump period is determined by a jump period pulse s which is obtained by adjusting, in a pulse width adjusting circuit 36, the pulse width of a reproduced vertical synchronizing signal PB. VX applied to a terminal 50.

The two jump voltage outputs from jump voltage forming circuit 37 are fed to inputs H and L, respectively, of a switch circuit 39, in which one or the other of the jump voltages is selected in accordance with a selection signal i applied to circuit 39 and which is formed in a manner hereinafter described in detail. The selected jump voltage is fed from a terminal 40 to bimorph leaf 5 through integrating and driving circuit 20 (FIG. 14) whereby a proper head jump is effected.

For judging the jump condition to be selected, trace control circuit 19 of FIG. 16 is further shown to have a terminal 41 to which there is fed a reference vertical synchronizing signal of advanced phase ref. AD. V formed from the references synchronizing signal ref. SYNC. This synchronizing signal ref. AD. V, as shown in FIG. 17A, is 125.5H ahead (advance) of a first equalizing pulse of the reference synchronizing signal ref. SYNC. The synchronizing signal ref. AD. V is applied to a reset input R of a counter 42, while a clock input CK of counter 42 receives a clock pulse (14 $f_H$) which is obtained by dividing the frequency of the output of clock oscillator 25 by thirty in a frequency divider 43. Therefore, counter 42 counts the clock pulse (14 $f_H$) from the trailing edge of the reference vertical synchronizing signal of advanced phase ref. AD. V. The counting value of counter 42 is used for measuring a phase difference $\phi$ between the reference signal ref. AD. V and the reproduced synchronizing signal PB. AD. V corresponding to the track center. The reproduced synchronizing signal of advanced phase PB. AD. V, as shown in FIG. 17B, occurs 123H ahead (advance) of the first equalizing pulse in the reproduced video signal, and, therefore, it occurs when the head 4 is positioned nearly centrally of the track.

The counting output of counter 42 is fed to a latch circuit 45, in which the counting value is latched with the rise of signal PB. AD. V. The output of latch circuit 45 is representative of the phase difference data $\phi$. Such data $\phi$ in the normal reproducing mode, is 32 (2.5H) and it varies from 0 to 64 in correlation with the phase variation range of $\pm\alpha/2$, as in FIGS. 9A through 9D. The output of latch circuit 45 is fed to a latch circuit 46 and is latched with the rise of the next succeeding signal PB. AD. V. Consequently, the phase difference data $\phi$ before and behind one field (one scan or trace) are held in latch circuits 46 and 45. Outputs $\phi$ and $\phi'$ of latch circuits 45 and 46, respectively, are fed to a magnitude comparator 47 where the magnitudes of data $\phi$ and $\phi'$ are compared with each other to determine the polarity of the phase variation. In other words, the polarity $(+/-)$ of variation $\Delta$ of the phase difference is detected by the comparator 47. More particularly, if the former data $\phi'$ is greater than the latter data $\phi$, the output j of comparator 47 goes high, which shows that $\Delta$ is positive. Conversely, if the data $\phi'$ is less than the data $\phi$, the output j of comparator 47 goes low to indicate that $\Delta$ is negative.

The output j of comparator 47 is applied to a D-input of a D-type flip-flop 52 so as to be read by the latter and thereby transmitted as polarity data $\pm\Delta$ to ROM 30 for, as previously noted, establishing priority of fraction extraction, as shown in the graph of FIG. 16. A trigger pulse for flip-flop 52 is formed by delaying the reproduced synchronizing signal of advanced phase PB. AD. V by about 0.5 $\mu$s in a delay circuit 53, and is applied to a trigger input T of flip-flop 52 through an AND gate 54.

The maximum value output (64×14 $f_H$ clock pulses=about 6.4H) at the most significant bit of counter 42 is fed as a start pulse k to the reset input of variable delay circuit 38 and to a reset input of a 1/5 frequency divider 44. The 1/5 frequency divider 44 divides by five the output of the 1/30 frequency divider 43 so that the output frequency divider 44 provides a clock pulse at a frequency of 2.8 $f_H$ (0.36H=$\alpha$/7) and which is in synchronism with the fall of start pulse k, as is apparent from FIGS. 17C and D. This clock pulse 2.8 $f_H$ is fed to the clock input CK of variable delay circuit 38. The variable delay circuit 38 may be a counter which counts 1 number of 2.8 $f_H$ clock pulses in accordance with the fraction data-output 1 of latch circuit 33. Therefore, variable delay circuit 38 provides a phase comparison pulse q which has been delayed by $(\alpha/7) \times 1$ (H) from the fall of start pulse k. The fall of start pulse k corresponds to the phase of 30 $\alpha/2(+1.25H)$ in the direction of the ordinates on FIG. 13, and the phase comparison pulse q corresponds to the phase of each quantized fraction 1=0~7.

The phase comparison pulse q is fed to a D input of a D-type flip-flop 48. A trigger input T of flip-flop 48 has applied thereto a pulse r (FIG. 17F) which is formed in a delay circuit 49 by delaying the reproduced synchronizing signal of advanced phase PB. AD. V (FIG. 17B) from terminal 35 by 2.1H+1.25H. The rise of pulse r is positioned $+\alpha/2(1.25H)$ after the fall of start pulse k, and, in the normal reproducing mode, the rise of pulse r is at the origin of the graph of FIG. 13.

The flip-flop 48 reads the level of phase comparison pulse q at the rise of pulse r. For example, when l=3, a pulse $q_3$ of FIG. 17E is obtained from variable delay circuit 38 and, if the rise of pulse r is later than the fall of pulse $q_3$, the output i at terminal Q of flip-flop 48 goes low. The low output of flip-flop 48 means that the reproduced phase at the track center is below the boundary line in FIG. 13. In this case, therefore, an (m−1) skip (small jump) should be performed to cause a phase variation $\Delta=(n-m)$ in the next tracing or scan. On the other hand, if the rise of pulse r occurs earlier than the fall of pulse $q_3$, the output i of flip-flop 48 goes high which means that the reproduced phase is above the boundary line in FIG. 13. In this case, an m skip (large jump) should be performed to cause a phase variation $\Delta'=(n-m-1)$ in the next tracing or scan.

The output i of flip-flop 48 is fed as a selection signal to switch circuit 39 which, according to whether output i is at the high level H or low level L, selects the large jump voltage output m or the small jump voltage output m−1, respectively, of circuit 37. Since phase comparison in flip-flop 48 is performed according to the fraction 1 independently of the speed range information m, only one circuit arrangement is required for judging the jump conditions with reference to the stepped boundary lines for the several speed ranges of FIG. 13.

The prevention of erroneous judgment in the establishment of priority when extracting fraction data 1 in FIG. 15 will now be explained.

As can be seen from FIG. 9D, in the +1.05-fast reproducing mode, there usually occurs a phase variation of $\Delta=\alpha/20$ for each tracing or scan and, in this case, the selection pulse output i of flip-flop 48 is at low level L. Once the reproduced phase at the track center goes above the boundary line in FIG. 13, the output i of flip-flop 48 turns high (i=H) at time $t_{20}$ on FIG. 9D, whereby there is performed a+1 skip and the reproduced phase in the next tracing or scan changes by a large amount, that is, $\Delta' = -0.95\alpha$. When flip-flop 52 in FIG. 15 detects this negative phase change $\Delta'$, an erroneous polarity judgment results. Moreover, as shown in FIG. 9C, in the case of a phase variation of $\Delta' = -\alpha/5$ (i=H), if the output i of flip-flop 48 turns low (i=L) at time $t_5$, there occurs a phase variation $\Delta = +4/5\alpha$. This positive phase change causes an erroneous polarity judgment in the establishment of priority.

To prevent such an error, in both cases, that is, when output i turns high in response to $\Delta$ being positive and output i turns low in response to $\Delta$ being negative, the transfer of output j of comparator 47 to ROM 30 through flip-flop 52 is stopped and the previous data in flip-flop 52 is used as the polarity data. For this purpose, the output $\pm\Delta$ of flip-flop 52 and the output i of flip-flop 48 are fed to an exclusive OR gate 55 which has its output connected to another input of AND gate 54. In each of the two above-described conditions, that is, if output i turns high when $\Delta$ is positive, or if output i turns low when $\Delta$ is negative, the output of gate 55 goes low, and such low level output of gate 55 causes AND gate 54 to be closed, so that a new latching operation of flip-flop 52 is prohibited.

The synchronous processing circuit 18 of FIG. 14 will now be described in detail with reference to FIGS. 18 and 19A-19J.

The reproduced vertical synchronizing signal of advanced phase PB. AD. V fed to terminal 35 in FIG. 15 is positioned at a nearly central part of a reproduced picture signal and, therefore, such synchronizing signal is not actually recorded on each track, but is rather equivalently created in the synchronous processing circuit of FIG. 18. In a helical scan VTR of the type having one field recorded in each track, it is fairly difficult to obtain a stable picture phase representing signal. More particularly, the rift of a picture is generally positioned at the vertical synchronizing part and, therefore, in a 2-head VTR employing video switching, the reproduced vertical synchronizing signal is very badly influenced by transient or phase changes at the switching point and by skew distortion at the initial end portion of each track. In a 1-head VTR, since the non-reproducible period occurring during movement from one track to the next must inevitably be brought into the vertical synchronizing period (blanking period), it is extremely difficult to stably reproduce a vertical synchronizing signal.

In a SMPTE type C format VTR, moreover, a synchronizing signal capable of representing the picture phase is not recorded in the beginning of each track. In skip tracing, moreover, at the initial or terminal end of a track there sometimes is a portion where the head and the tape are not in contact, so that even though a picture phase representing signal is obtainable in the normal reproducing mode, such signal is sometimes unobtainable in a different speed reproducing mode. Furthermore, a picture phase representing signal, such as the reproduced vertical synchronizing signal of advanced phase PB. AD. V used for the trace control in the embodiment of the invention herein described, must be formed predictively before the start of each field of the picture. Because the picture phase representing signal is positioned nearly centrally of a reproduced picture signal by delaying the picture phase representing signal from a specific point of the reproduced picture signal, when head jump or track jump has occurred, the picture phase representing signal no longer represents the center of the picture signal as long as the amount of delay is not changed.

The synchronism processing circuit 18 for taking into account the above considerations will now be described in detail with reference to FIGS. 18 and 19A-19J.

The time chart of FIG. 19A represents a track T being reproduced and a track T' which is to be next reproduced. Between the tracks T and T', a jump is performed. FIG. 19B shows a reproduced synchronizing signal PB. SYNC which is reproduced from the track T. At the terminal end of track T equalizing pulses eq are reproduced in the vertical blanking period (FIG. 19B). The reproduced synchronizing signal PB. SYNC is fed from a terminal 58 in FIG. 18 to an equalizing pulse detector 59 which provides a first equalizing pulse detection signal u, as shown in FIG. 19C. The detection signal u is applied, as a reset pulse, to a direct reset input RD of a counter 62 via an AND gate 60 and an OR gate 61.

Figure 18:
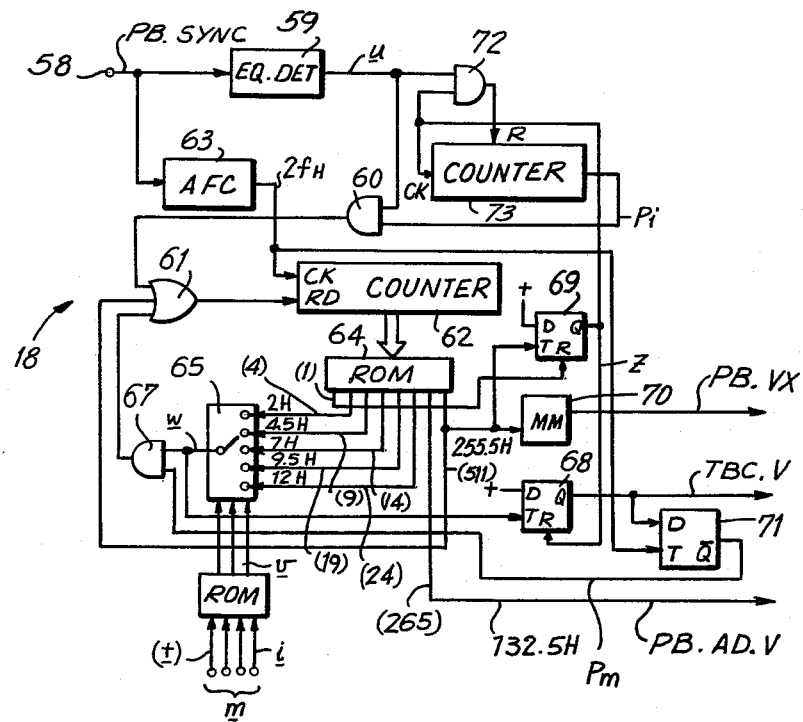
FIG. 18 is a block diagram of a synchronous processing circuit also included in the system of FIG. 14.

The counter 62 has a counting length (9 bits) of 1 V (vertical period), and to its clock input CK there is applied a 2 $f_H$ clock pulse (FIG. 19D) from an AFC circuit 63. The 2 $f_H$ clock pulse is frequency-locked to the reproduced synchronizing signal PB. SYNC by the AFC circuit 63. Therefore, the counting value of counter 62 increases or increments, for example, in the order 0, 1, 2, 3, ... at every 0.5H starting from the rise of the first equalizing pulse detection signal u, as shown in FIG. 19E. The output of counter 62 is fed to a ROM 64 where it is converted into decimal numbers. In FIG. 18, the parenthesized numerals applied to the output lines of ROM 64 are the counting values of counter 62 after conversion to decimal numbers. As shown in FIG. 19E, these counting values 1, 2, 3, ... respectively, correspond to the positions 0.5H, 1H, 1.5H, ... measured from the first equalizing pulse eq.

The outputs 4 (2H), 9 (4.5H), 14 (7H), 19 (9.5H) and 24 (12H) of ROM 64 are fed to a data selector 65 which selects one of them as a position pulse W. The data selector 65 is controlled according to the kind of jump (skip) occurring when the reproducing head moves from the track T to the next track T'. Therefore, when a variation of the reproduced phase has occurred upon jumping, the reset timing for counter 62 is changed to prevent a substantial change in the phase of the picture phase representing signal which represents the phase of a specific point of the reproduced picture signal. More particularly, a selection control signal v for the data selector 65 is formed by a ROM 66 on the basis of the speed range signal m from latch circuit 33 in FIG. 15 and the high level or low level jump selection signal i from flip-flop 48. The output v (3 bits) of ROM 66 corresponds to the five kinds of skip or jump amounts (−2 skip, −1 skip, 0 skip, +1 skip, +2 skip) shown in FIG. 13.

At a time of 0 skip, the 7H output (14) of ROM 64 is selected as the position pulse w by data selector 65 and is fed to the direct reset input RD of counter 62 via an AND gate 67 and OR gate 62, so that counter 62 is reset by such 7H output, as shown in FIG. 19E. Thereafter, each position pulse obtained from counter 62 and ROM 64 comes to represent the correct phase of the reproduced picture signal. Since the 255.5H position pulse (counting value 511) of ROM 64 is fed directly to the direct reset input of counter 62 via OR gate 61, counter 62 is again reset by the 255.5H position pulse (the position of the first equalizing pulse detection signal u), as shown in FIG. 19E.

The position pulse W from data selector 65 is also fed to a trigger input T of a D-type flip-flop 68 which, in response to such position pulse, reads in a D input (+) so that its Q output goes high, as shown in FIG. 19F. The Q output of flip-flop 68 is fed to time base corrector 16 in FIG. 14 as the synchronizing signal TBC. V representing a specific position of the reproduced picture. The time base corrector 16 corrects the time base of the reproduced picture signal with reference to the rise of synchronizing signal TBC. V.

The flip-flop 68 is reset so that its output Q goes low, as shown in FIG. 19F, by an output z (FIG. 19G) of a flip-flop 69 which is set by the 255.5H position pulse output of ROM 64 and reset by the 0.5H position pulse output (counting value 1) of ROM 64. Therefore, the low level pulse width of synchronizing signal TBC. V is usually 7H. The output TBC. V of flip-flop 68 is also fed to a D-input of a D-type flip-flop 71 which has a 2 $f_H$ clock trigger input applied from AFC 63. Consequently, an inverted output Q of flip-flop 71 provides a mask pulse Pm delayed by one bit from TBC. V, as shown in FIG. 19H. This mask pulse Pm is fed to AND gate 67 for preventing resetting of counter 62 by a position pulse w from data selector 65 after counter 62 has once been reset by an earlier occurring position pulse w from data selector 65.

The 255.5H position pulse output of ROM 64 is also shown to be applied to a monostable multivibrator 70 which forms a synchronizing signal PB. VX with a pulse width of 12H, as shown in FIG. 19I. This synchronizing signal PB. VX, as previously mentioned with reference to FIG. 15, is fed to pulse width adjusting circuit 36 in which there is formed a jump period pulse s. In response to this jump period pulse s, a head jump is effected at a time about 12H from the first equalizing pulse eq in the reproduced signal.

Referring again to FIG. 18, it will be seen that the 132.5H position pulse output (count value 265) of ROM 64 is taken out as the reproduced vertical synchronizing signal PB. AD. V of advanced phase (FIG. 19J) which is fed to terminal 35 in FIG. 15. This synchronizing signal PB. AD. V represents the central phase of the reproduced picture signal and it is positioned 123H ahead of the first equalizing pulse in the next field.

The output pulse z (FIG. 19G) of flip-flop 69 is also fed to one input of an AND gate 72. The other input of AND gate 72 has applied thereto the first equalizing signal detection signal or pulse u, so that, when pulses u and z are in phase, there is obtained an output from AND gate 72, which output is fed as a reset pulse to a 2-bit counter 73. The pulse z is also applied to a clock input CK of counter 73, and the output Pi of counter 73 is applied, as a reset inhibit pulse, to AND gate 60. Consequently, while the pulses u and z are in phase, counter 73 continues to be reset, and its inhibit pulse output Pi remains at a low level. Therefore, AND gate 60 stays closed, so that counter 62 cycles itself without being reset by the output pulses u of equalizing pulse detector 59. In other words, a fresh equalizing pulse in the reproduced synchronizing signal can only reset counter 62 in the case of initial reset and disorder of the system, thus ensuring that the foregoing synchronizing signals PB. VX, TBC. V and PB. AD. V are properly formed.

When the pulses u and z become out of phase and the resetting of counter 73 is interrupted, the output Pi of counter 73 goes high in the fourth field (that is, in response to four z pulses), thus allowing gate 60 to be opened, whereby the output pulse u of equalizing pulse detector 59 is delivered through gates 60 and 61 to the reset input of counter 62. As a result, the synchronous processing circuit of FIG. 18 is gen-locked to the actual, fresh reproduced synchronizing signal (the first equalizing pulse). This gen-lock operation does not react to an accidental erroneous signal or drop-out since there is provided a redundancy corresponding to a 4-field period. Therefore, the phase of each of the synchronizing signals PB. VX and TBC. V is securely protected by the output address (counting value) of counter 62. Although, in the SMPTE type C format tape pattern, a track jump sometimes causes an equalizing pulse not to be produced near the $-1$ speed ratio, even in this case counter 62 cycles itself so that the synchronizing signals are formed without any trouble.

As previously noted, when skip tracing is performed in a speed-varied reproducing mode, a particular position pulse from ROM 64 is selected by data selector 65 according to the kind of the skip. For example, in the $+\frac{1}{2}$-slow reproducing mode, as shown in FIG. 8A, the phase step of X→□ occurs by a jump at every tracing or scan. The amount of such phase step b is determined from equations (4a) and (4b) to be $b=+\alpha$ or $b=0$, respectively. Therefore, in the case of the $\frac{1}{2}$-slow reproducing mode, data selector 65 in FIG. 18 selects the 4.5H position pulse according to $m=0$ and $i=L$. As a result, the reset phase of counter 62 is advanced by $+\alpha$ (that is, 2.5H) beyond 7H (center), whereby the synchronizing signals TBC. V and PB. VX advance by 2.5H, and the phase of these synchronizing signals does not change when viewed relative to the phase of the actually reproduced picture signal. On the other hand, the phase of the synchronizing signal PB. AD. V advances by $+1.25H$ due to accumulation of the periodic variation $\alpha H/2$ of the 2 $f_H$ clock pulses by counter 62, and this phase of signal PB. AD. V correctly represents the center of the reproduced picture signal. At a time of $+2$ skip, the 2H position pulse is selected by selector 65 as a reset pulse, while at times of $-1$ skip and $-2$ skip, the 9.5H and 12H position pulses, respectively, are selected by selector 65.

The advantageous features of the hereinbefore described embodiment of this invention will now be summarized. First, with the described tracking servo system embodying the invention, there can be obtained a reproduced picture at a picture reproducing speed which fluctuates the least in respect to an arbitrarily selected tape speed. The foregoing results from the fact that the tracing form is determined primarily by the fraction l and the integer m extracted from the reproducing speed ratio n, and that the reproduced phase dispersion at a specific point on successive tracks is compensated so as to be within 2.5H. Particularly, even when the arbitrarily selected value of n is near an integer value, the value of l does not fluctuate, and the tracing form is fixed. Therefore, tracings which are abnormal in time base speed dispersion, such as, unbalance slow and frame still tracing, substantially cannot occur. Consequently, when reproducing a picture which contains a moving body, a smooth moving body picture can be obtained at any arbitrarily selected reproducing speed.

The term "frame still" referred to above means that there is performed a combined tracing of $+1$ and $-1$ speed ratios so that $n=1-1$ to provide the still reproducing mode of $n=0$. In the still reproducing mode, the same track should be traced repeatedly or in an overlapped manner. However, in the "frame still" mode two adjacent tracks are traced alternately, so that, if such adjacent tracks have recorded therein a moving body picture, the reproduced still picture fluctuates. Such "frame still" mode has occurred in previously known devices of this sort, but, in the device according to the described embodiment of this invention, the value of the fraction l is fixed to 0 or 7 in accordance with FIG. 16, and in all cases only a −1 skip is performed on both sides of the boundary n=0, as shown in FIG. 13. Moreover, when speed ratio n is an integer, the detected polarity (±Δ at the output flip-flop 52 in FIG. 15) of phase variation Δ sometimes become + and − alternately due to jitter of the reproduced signals. However, in the described embodiment of the invention, such alternation of the detected phase variation polarity cannot cause a malfunction since, on both sides of each integral speed point in FIG. 13, there are performed skips of the same amount and in the same direction. The ROM 30 may be constructed so that when Δ=0, its polarity detection result is either + or −.

It will be appreciated that, in the described embodiment of the invention, the tracing by head 4 can be controlled intensively by processing only the fraction portion l of the selected speed ratio n which is advantageous in providing a tracking system with a widely variable reproducing speed range and which is suitable for digital processing.

Furthermore, since the skip amount can only be m or (m−1), accidental picture movement is not likely to occur. For example, at reproducing speed ratio n=(m+1/60), the reproduced phase variation at every tracing or scan is Δ=+α/60, so that, if a sudden phase delay of more than α/2 occurs, a recovery time of more than 0.5 sec. (30 fields) is required. Heretofore, in order to avoid the problems associated with the boundary of integral speed ratio, a multi-skip tracing form involving skip amounts of (m−2), (m+1), (m+2) in addition to m and (m−1) has been applied simultaneously in an overlapped manner. However, this is not necessary in the above-described embodiment of this invention so that the resulting tracking system is much simplified.

Having described an illustrative embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An apparatus for reproducing information signals recorded in successive parallel tracks extending obliquely on a record tape, which apparatus includes transducer means repeatedly scanning across the tape generally in a direction along the tracks for reproducing the signals recorded therein while the tape is advanced longitudinally at a selected reproducing speed which is any arbitrary ratio n of a normal reproducing speed, and transducer deflecting means responsive to a drive voltge for deflecting said transducer means in a direction transverse to said direction along the tracks; a tracking control system comprising means for determining the value of said ratio n; means for extracting, from said value of the ratio n, the values m and l of an integer and a fraction, respectively, which, when added to each other, provide a sum equal to said ratio n; means for forming relatively large and small head jump voltages which respectively correspond to said value m and a value (m−1); means for providing a reproduced phase of the output of said transducer means in correspondence to a specific position along a track; means for forming a reference phase on the basis of said value l; discriminating means for determining whether said reference phase is in leading or lagging relation to said reproduced phase; means responsive to said discriminating means for selecting one of said large and small head jump voltages; and means operative at the end of each said scanning for including the then selected one of said large and small head jump voltages in said drive voltage applied to said transducer deflecting means for determining the next one of said tracks to be scanned.

2. Apparatus according to claim 1; in which said information signals further include horizontal synchronizing signals also recorded in said tracks on said record tape and being reproduced by said transducer means; and in which said means for determining the value of said ratio n includes oscillator means for generating clock signal pulses, counter means for counting said clock signal pulses from a preset value, means responsive to the reproduced horizontal synchronizing signals for presetting said counter means to said preset value, and latch means for latching the count value of said counter means immediately prior to each presetting of the latter with the latched count value being representative of said value of ratio n.

3. Apparatus according to claim 2; in which said means for determining the value of said ratio n further includes checking means comparing successive latched count values of said latch means and inhibiting further transfer of a latched count value when there is more than a predetermined difference between the latter and a previously latched count value.

4. Apparatus according to claim 1; in which said information signals are video signals which include horizontal synchronizing signals also recorded in said tracks on said record tape and being reproduced by said transducer means; and in which said means for determining said value of the ratio n includes means responsive to the period of the reproduced horizontal synchronizing signals to provide a digital signal representative of the variation of said period from a normal value and hence representative of said value of the ratio n; and said means for extracting the values of m and l from said value of the ratio n includes ROM means receiving said digital signal and outputting corresponding values of m and l.

5. Apparatus according to claim 4; further comprising means responsive to said digital signal representative of the value of the ratio n for including, in said drive voltage applied to said transducer deflecting means, a track inclination compensation voltage.

6. Apparatus according to claim 4; in which said ROM means has upper output bits providing said integer value m and the polarity thereof and lower output bits providing said fraction value l; and said means for forming relatively large and small head jump voltages is connected with said upper output bits of said ROM means so as to be responsive to the corresponding integer value m.

7. Apparatus according to claim 1; in which said means for providing a reproduced phase of the output of said transducer means includes means responsive to said value m and to said discriminating means for controlling the timing of said reproduced phase so as to ensure that the latter remains in said correspondence to said specific position along a track from which the signals are reproduced after said selected one of the head jump voltages has been included in said drive voltage.

8. Apparatus according to claim 7; in which said information signals are video signals which include synchronizing signals also recorded in said tracks and being reproduced by said transducer means; said means for providing a reproduced phase of the output of said transducer means further includes a means generating clock pulses in synchronism with the reproduced synchronizing signals, counter means for counting said clock pulses and having a reset input, memory means addressed by counting values of said counter means to provide successively occurring position pulse outputs at respective intervals after resetting of said counter means with one of said position pulse outputs of the memory means being said reproduced phase of the output of said transducer means; and said means for controlling the timing of said reproduced phase includes data selector means for selectively applying others of said position pulse outputs of said memory means to said reset input of the counter means, and control means for said data selector means responsive to said value m and said discriminating means.

9. Apparatus according to claim 8; in which said means for providing a reproduced phase of the output of said transducer means further includes means to detect a first equalizing pulse in the reproduced synchronizing signal, means for applying said first equalizing pulse to said reset input of the counter means, and means responsive to position pulse output of said memory means corresponding to said first equalizing pulse for blocking the application of the latter to said reset input so long as said first equalizing pulse and said corresponding position pulse output of the memory means are in phase with each other.

10. Apparatus according to claim 9; in which said means for providing a reproduced phase of the output of said transducer means further includes masking means preventing resetting of said counter means by a position pulse output from said memory means after said counter means has been reset by a position pulse output during a counting cycle of said counter means.

11. Apparatus according to claim 1; in which said means for forming a reference phase includes a source of reference synchronizing signals, means for generating periodic reference pulses in predetermined timed relation to said reference synchronizing signals, and variable delay means receiving said periodic reference pulses and delaying the latter in accordance with said value l to provide said reference phase.

12. Apparatus according to claim 11; in which said discriminating means includes D-type flip-flop means having a D input receiving the delayed periodic reference pulses from said variable delay means and a trigger input receiving said reproduced phase, said D-type flip-flop means having first and second output signal levels in response to the relative timing of said delayed periodic reference pulses and said reproduced phase.

13. Apparatus according to claim 12; in which said information signals are video signals including synchronizing signals which are also recorded in said tracks and reproduced by said transducer means; further comprising a source of reference synchronizing signals, means for determining any phase difference between said synchronizing signals as reproduced and said reference synchronizing signals, means for comparing said phase difference in two successive periods of the reproduced signals and thereby providing an output indicative of the polarity of any variation of said reproduced phase; and in which said means for forming a reference phase on the basis of said value l also receives said output indicative of polarity and gives priority thereto.

14. Apparatus according to claim 13; in which said synchronizing signals include horizontal synchronizing signals; and in which said means for determining said value of the ratio n includes means responsive to the period of the reproduced horizontal synchronizing signals to provide a digital signal representative of the variation of said period of the horizontal synchronizing signals from a normal value and hence representative of said value of the ratio n; and said means for extracting the values of m and l from said value of the ratio n includes ROM means receiving said digital signal and said output indicative of polarity and outputting corresponding values of m and l.

15. Apparatus according to claim 14; further comprising flip-flop means through which said output indicative of polarity is adapted to be passed to said ROM means, and means controlling said flip-flop means to permit passage of said output indicative of polarity therethrough only when the latter is consistent with said discriminating means.

* * * * *